US007689994B2

(12) United States Patent
Vronay et al.

(10) Patent No.: US 7,689,994 B2
(45) Date of Patent: Mar. 30, 2010

(54) SYSTEM AND METHOD FOR SPECIFYING AND EXECUTING TEMPORAL ORDER EVENTS

(75) Inventors: David P. Vronay, Beijing (CN); Alexander S. Stojanovic, Redmond, WA (US); Matthew B. MacLaurin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 10/766,431

(22) Filed: Jan. 28, 2004

(65) Prior Publication Data

US 2005/0166179 A1 Jul. 28, 2005

(51) Int. Cl.
*G06F 9/46* (2006.01)
(52) U.S. Cl. ........................... 718/103; 717/105
(58) Field of Classification Search ......... 717/105–109, 717/116–120; 706/19; 718/102
See application file for complete search history.

(56) References Cited

U.S. PATENT DOCUMENTS

| 4,642,756 A | * | 2/1987 | Sherrod ........................ 718/103 |
| 4,646,231 A | * | 2/1987 | Green et al. .................. 718/106 |
| 4,821,220 A | * | 4/1989 | Duisberg ........................ 703/2 |
| 5,016,170 A | * | 5/1991 | Pollalis et al. ................ 705/7 |
| 5,093,794 A | * | 3/1992 | Howie et al. ................ 700/100 |
| 5,247,668 A | * | 9/1993 | Smith et al. ................. 717/154 |
| 5,515,490 A | * | 5/1996 | Buchanan et al. ........ 715/500.1 |
| 5,563,994 A | * | 10/1996 | Harmon et al. ............. 345/440 |
| 5,671,338 A | * | 9/1997 | Araki et al. .................. 706/46 |
| 5,717,438 A |  | 2/1998 | Kim et al. |
| 5,768,586 A | * | 6/1998 | Zweben et al. .............. 713/100 |
| 5,983,016 A | * | 11/1999 | Brodsky et al. ............. 717/104 |
| 5,991,536 A | * | 11/1999 | Brodsky et al. ............. 717/104 |
| 6,049,805 A |  | 4/2000 | Drucker et al. |
| 6,053,951 A | * | 4/2000 | McDonald et al. .......... 717/109 |
| 6,088,659 A | * | 7/2000 | Kelley et al. .................. 702/62 |
| 6,230,312 B1 | * | 5/2001 | Hunt ........................... 717/108 |
| 6,317,774 B1 |  | 11/2001 | Jones et al. |
| 6,323,882 B1 | * | 11/2001 | Jerome et al. ............... 715/744 |
| 6,477,660 B1 | * | 11/2002 | Sohner .......................... 714/1 |

(Continued)

OTHER PUBLICATIONS

Babanov et al. "Scheduling Tasks with Precedence Constraints to Solicit Desirable Bid Combinations" Jul. 2003 (8 pages).*

(Continued)

*Primary Examiner*—Wei Y Zhen
*Assistant Examiner*—Phillip H Nguyen
(74) *Attorney, Agent, or Firm*—Lee & Hayes, PLLC

(57) ABSTRACT

The system and method of the present invention relates to the determining the specific ordering and execution of events from temporal constraints, filtering functions, and execution heuristics. To facilitate specification of event order objects be can associated with events in an object authoring system which provides for interaction, conditional behavior, and fuzzy relationships by dividing all time into past, present, and future. A user or developer can then perform all their work in the editable area marked "now." Items that may have happened prior to the current work show up in the "past" area and items which might happen in the future show up in the "future" area. A user can then associate and/or dissociate objects associated with events in the editable area, for instance by simply loosely specifying temporal relationships or constraints amongst objects rather than specifying an exact temporal sequence directly.

35 Claims, 19 Drawing Sheets

U.S. PATENT DOCUMENTS

| | | | |
|---|---|---|---|
| 6,490,573 B1* | 12/2002 | Njemanze | 706/19 |
| 6,490,612 B1 | 12/2002 | Jones et al. | |
| 6,751,623 B1* | 6/2004 | Basso et al. | 707/101 |
| 6,810,503 B1* | 10/2004 | David et al. | 715/201 |
| 6,910,204 B1* | 6/2005 | Rossomando | 717/108 |
| 6,934,947 B1* | 8/2005 | Zeidman | 718/100 |
| 6,981,250 B1* | 12/2005 | Wiltamuth et al. | 717/170 |
| 7,003,475 B1* | 2/2006 | Friedland et al. | 705/9 |
| 7,076,762 B2* | 7/2006 | Fisher | 717/102 |
| 7,246,055 B1* | 7/2007 | Singh | 703/20 |
| 7,257,575 B1* | 8/2007 | Johnston et al. | 707/4 |
| 7,376,733 B2* | 5/2008 | Connelly et al. | 709/224 |
| 2002/0087623 A1* | 7/2002 | Eatough | 709/203 |
| 2004/0133889 A1* | 7/2004 | Colle et al. | 718/100 |
| 2004/0205225 A1* | 10/2004 | Green | 709/232 |

OTHER PUBLICATIONS

Y. Theodoridis, M. Vazirgiannis, and T.K. Sellis. Spatio-Temporal Indexing for Large Multimedia Applications. In International Conference on Multimedia Computing and Systems, pp. 441-448, 1996.

Howook Jang and Mansoo Kim. A Three Dimensional Interface for Temporal Information Retrieval. Electronics and Telecommunications Research Institute, Korea, 1996. 11 pages.

* cited by examiner

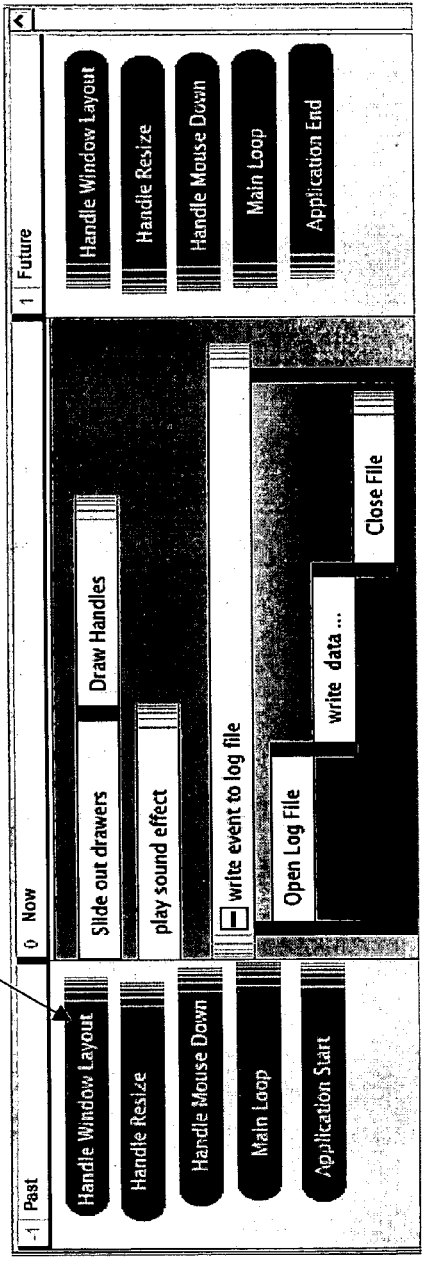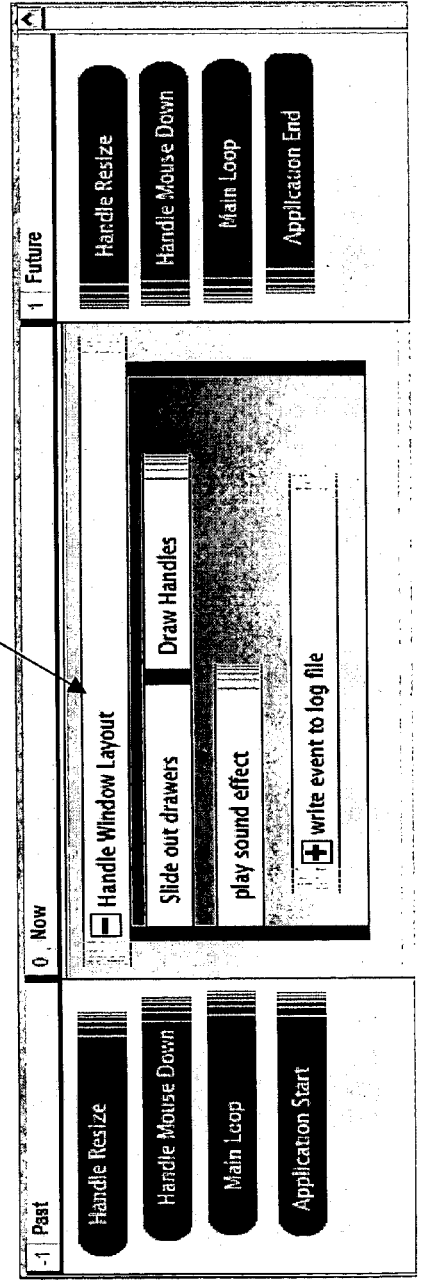
Fig. 14a
Fig. 14b

SYSTEM AND METHOD FOR SPECIFYING AND EXECUTING TEMPORAL ORDER EVENTS

TECHNICAL FIELD

The present invention relates generally to computers and more particularly toward system and method for specifying temporal ordering of events.

BACKGROUND

Timeline authoring tools have conventionally been employed to specify event orders such as sequences of animations. Such conventional timelines are best suited for static, linear sequences (such as MIDI sequencers) and do not lend themselves to interactive content. This forces authors to supplement their timelines with scripted actions, which are not represented. Conventional timelines also force frame accuracy on authors, which interferes with rapid explorations of different designs.

The timeline in conventional authoring tools such as Macromedia's Flash and Director are largely unchanged from their progeny. MusicWorks, the predecessor to VideoWorks, was a program designed to play music on a Macintosh computer. The user was presented with four channels of sound and could insert events into the channels at regular frame intervals, displayed either as a timeline or notes. Time flowed from left to right in discrete frames, the duration of which could be controlled globally by the user. MusicWorks was extended to support animation and became VideoWorks. VideoWorks kept the channel metaphor, including the name "score" but extended the previous technology to support one channel for each graphic object in the screen. VideoWorks became a common tool for presentations and application prototyping. In time, it grew in capabilities and sophistication until being renamed Director in 1988—a name intended to emphasize its role as an interaction design tool rather than just a simple animation tool. Despite this shift in intended usage from non-interactive linear sequences to highly interactive sequences, the central "score" metaphor, the timeline, remained largely unchanged.

Turning to FIG. 19, a conventional timeline 1900 as is presently known in the art is depicted. Conventional timeline 1900 consists of a series of tracks or channels 1910. A track corresponds, more or less, to an object such as a button. The tracks 1910 are divided up into frames 1920. Each frame is an atomic unit of time, for example $\frac{1}{30}^{th}$ of a second. Behavior is specified by putting events in a particular frame of a particular track. For instance, if a user wants a button to turn red in 10 seconds, they would put a "set the fill color to red" event in the buttons track at frame 300. If a user wants a button to move from location 5 to location 25 over a time of 5 frames, they would put a "set location" event at frame 1 to "5," at frame 2 to "10," at frame 4 to "20," and frame 5 to "25." This would result in an animation of the button moving.

The timeline metaphor is very easy for users to understand and begin working with. The grid of frames makes it very easy to specify the exact duration, sequence, and synchronization of animation events. Users can easily see exactly what is on the screen at a given instant in time. However, the timeline breaks down when asked to handle the needs of interactive applications.

Conventional timelines have numerous weaknesses or flaws. First, a conventional timeline is a line. It is a linear representation while interactions are inherently non-linear. Thus, when it comes to the representation of loops and conditions, conventional timelines are of no use. A designer or user thus is forced to jump around the timeline, sticking in sequences where they might fit and relying on embedded code to control the playback of time. Furthermore, conventional timelines are global meaning they always show the entire application. Combined with the sequential display, this results in the timeline quickly becoming inefficient for large and complicated projects. As described supra, interactive sequences force the user or designer to arbitrarily cut up the timeline, inserting sequences wherever they might fit and controlling the execution of them with embedded jumps. As timelines stretch to tens of thousands of frames, users often forget where in time they placed different animated sequences. This confusion also exists in the vertical dimension. With potentially hundreds or even thousands of objects in a complex application, there is no straightforward way of knowing which channel contains a particular object at a particular time. The author is forced to try and remember. Additionally, conventional timelines enforce a very literal and exact notion of time on the author. There is no provision for specifying things loosely. The timeline requires authors to say things like "at 5:00, do something for exactly 13.5 seconds." Authors cannot utilize loose expressions such as "do this after that" or "these have the same amount of time, but I don't know how long that will be." The inability to "sketch" has been a consistent complaint of authors utilizing conventional timelines. This exacting notion of time prevents a user from working at a rough level during initial exploratory phases of design. Storyboarding is a very common technique in the design of both interactive applications and interactive movies. Tools such as Denim allow a designer to quickly and easily sketch out both the user interface and simple causality in a natural manner. Conventional timelines make exploration and sketching extremely difficult. The user trying different variations is constantly wrestling with the timeline, inserting and deleting frames, pushing things around, and generally rearranging them to fit their needs. As the application develops and the timeline becomes more complex and fragmented, and the author becomes increasingly discouraged with fiddling with the application in fear that a small change may render the application inoperable.

The inability to specify actions in a loose and relative way also makes many tasks overly complicated. Consider the common task of playing an animation while the system is processing some data. The literal conventional timeline provides no way of accomplishing such a task. Instead, the author has to create an animation loop of a fixed duration and control it programmatically. These weaknesses as well as others taken together render the conventional timeline non-optimal for interactive multimedia authoring.

Many have attempted to make the timeline more powerful. Flash MX, for example, supports the notion of hierarchical channels in its timeline, where one layer can contain other layers. These other layers have their own clock and can be hidden when not in use. This makes it easy to script relative animations such as a moon that orbits a planet while the planet orbits the sun. While this helps somewhat to control clutter, it does not address the more serious problem of hiding the interaction. Wolber in "A Multiple Timeline Editor for Developing Multi-threaded Animated Interfaces" extends the timeline metaphor to support multiple synchronous streams. While this makes the authoring of simultaneous tasks easier and reduces timeline clutter, it still does not address the difficulty of viewing interaction. In the end, no conventional system metaphor exposes both temporal sequencing and interaction that facilitates management of application complexity while still enabling the user to work rough.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Disclosed herein is a system and method for ordering events. An event is defined as any action that happens in time. An event can be any sort of verb corresponding to a system action; from a data object being created to a property being changed that turns everything on a screen blue. Furthermore events can be simply text labels with no functionality, just serving as comments, placeholders, or temporal reference points. Temporal constraints can be associated with one or more events (e.g., start time, stop time, duration . . . ). According to an aspect of the invention, the event ordering system can receive temporal constraints, generate one or more event orderings, and select an optimal execution order based at least in part on execution system information.

According to another aspect of the subject invention, events can be associated with objects to facilitate specification of temporal constraints and filtering functions related to the execution of events. Furthermore and in accordance with another aspect of the subject invention, the system of the present invention can include a display component that provides a timeline user interface divided into three broad areas or sections—past, present, and future. The present section is an editable section containing a subset of application objects that a user is currently working on. The past and future sections can contain simplified object representations of events that happen before or after the present action. Among other things, the past and present areas can provide context and can serve as navigational aids for designers. However, it should be noted that this is only one way of view and editing events and associated temporal constraints. The present invention also contemplates other ways including but not limited to utilizing an XML text file.

According to one aspect of the invention, sketching is supported to allow users to work rough. Unlike conventional systems, users need not specify exact literal times that an event or task is to be executed. Rather the users need only specify information that that they desire. The rest of the information can be inferred by the system. For instance, a user can specify three events utilizing objects where the first object is positioned prior to the second object and the second object is position prior to the third object. In this situation, the information that has been conveyed by the user is that these events are to be executed in sequence. However, nothing has been specified as to the particular start and stop times of particular events or the duration for which each event will operate. This loose specification of events gives users the maximum ability to explore, create variations, and make adjustments. Furthermore, a program written in accordance with the present invention can be easily and automatically optimized by a computer or component thereof. The present invention thus is advantageous to users in that programs are easier to write, easy to optimize, and much less prone to error.

According to another aspect of the subject invention, the system and method provides support for both linear and non-linear structures. For example, objects can be specified representing nested events and differing versions of events. Furthermore, structures such as conditions (e.g., if then statements) and loops are also supported by the subject invention.

According to yet another aspect of the subject invention temporal filters can be as applied to events. For instance, every event can have a filter (e.g., linear) associated with it as a default. Temporal filters are pieces of code that map one relative time to another. Temporal filters can be defined for, inter alia, jittering, acceleration, and reversal. Furthermore, temporal filtering functions can be staked so that several filters can be applied to a single event. Temporal filters in conjunction with temporal object layouts can provide a user with a higher degree of control over the execution of particular events. This is particularly useful in animation such as for morphing.

In still another aspect of the subject invention, temporal queries are supported. Temporal queries allow a user to search for all events that meet a certain criteria and then have them presented in temporal order. For example, one could see how two buttons interact. Furthermore, the timeline object authoring system of the present invention can be used as a query viewer to allow users to easily scope or limit the view to just those events with which they are currently concerned as well as view context information from other sections such as the past and future sections.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

FIG. 14a is a diagram of a display component object layout in accordance with an aspect of the subject invention.

FIG. 14b is a diagram of a display component object layout in accordance with an aspect of the subject invention.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject invention.

Figure 1:
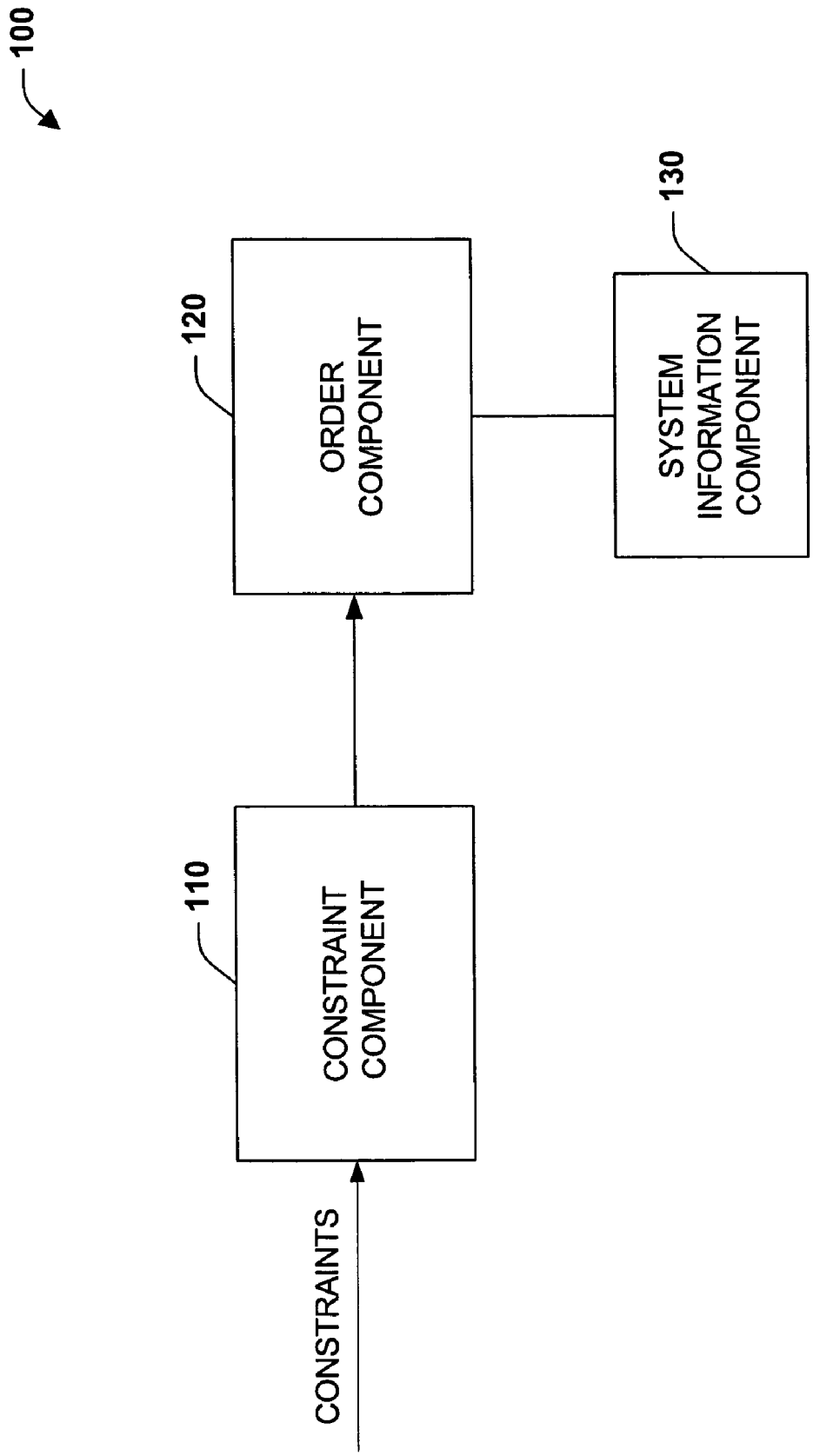
FIG. 1 is a block diagram of an event ordering system in accordance with an aspect of the present invention.

Turning to FIG. 1, a block diagram of an event ordering system 100 is illustrated in accordance with an aspect of the subject invention. Event ordering system 100 includes a constraint component 110, an order component 120, and a system information component 130. An event can be defined as any action that happens in time. Thus, an event could be a system provided verb (e.g., "change color," "move to position"), an arbitrary piece of code, or even a text comment (e.g., used as a temporal place holder). Constraint component 110 receives constraints associated with one or more events. Constraints specify information about execution of an event. For example, execution of event A begins at time X and ends at time Z. However, according to an aspect of the subject invention constraints need not completely and specifically describe event execution as in the above example. For instance, a constraint can simply be event A begins a time X. Furthermore, constraints can simply specify information about event execution relative to other events. For example, event A starts prior to event B or event A must terminate prior to starting event B, or event A is not finished until each of events D, E, and F are finished. Order component 120 receives constraints from constraint component 110 and derives an execution order for all events with respect to the constraints. For example, if there are two events, A and B, and a constraint specifying that event B must start after event A, then the ordering component can select amongst a plurality of different execution orders such as start A then immediately thereafter start B; start A, let A finish then start B; or start A and subsequently start B sometime during A's execution. Order component 120 can select an order at random or alternatively it can utilize system information to intelligently select an order. System information (also know herein as execution heuristics) is provided to order component 120 via system information component 130. System information component 130 retrieves or receives information regarding a system such as such as available memory, cache coherency, data throughput, number of processors and the like. Upon receipt of system information from system information component 130, ordering component 120 can then analyze the data utilizing any one or a plurality of methods to select an optimal execution order including but limited to utility-based analysis employing technologies associated with facilitating inference and decision making under uncertainty and optimization of expected utility and/or minimization of expected costs (e.g., Bayesian networks, neural networks . . . ).

Figure 2:
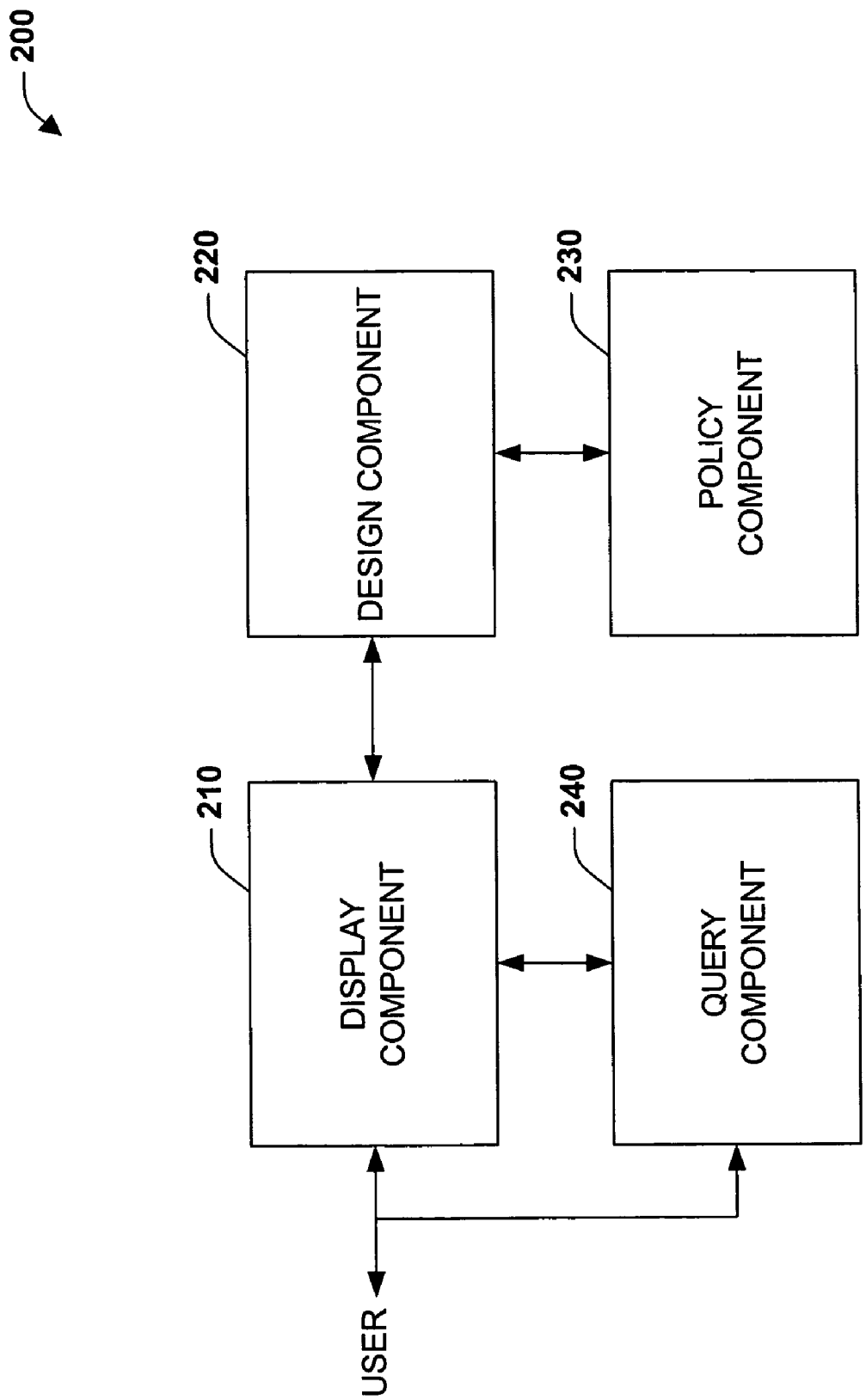
FIG. 2 is a block diagram of an interactive event ordering system in accordance with an aspect of the present invention.

FIG. 2 depicts an interactive event ordering system 200 in accordance with an aspect of the subject invention. Event ordering system 200 comprises display component 210, design component 220, policy component 230, and query component 240. Display component 210 provides a workspace for specifying and/or viewing objects and associated events by a user such as a programmer or designer. As described supra, an event can be defined as any action that happens in time. Accordingly, an event could be a system provided verb (e.g., "change color," "move to position"), an arbitrary piece of code, or even a text comment (e.g., used as a temporal place holder). Objects represent events so as to facilitate interaction therewith. Design component 220 temporally associates and/or disassociates objects associated with events specified by a user, and executes events based at least in part on the object associations specifying temporal constraints, filtering functions, and execution heuristics. Policy component 230, among other things, allows users to set policy as to the editing and execution of objects. Query component 240 enables the display of a subset of events that match a specific query thereby facilitating scoping the view within the display component 210 to particular objects and associated events.

Figure 3:
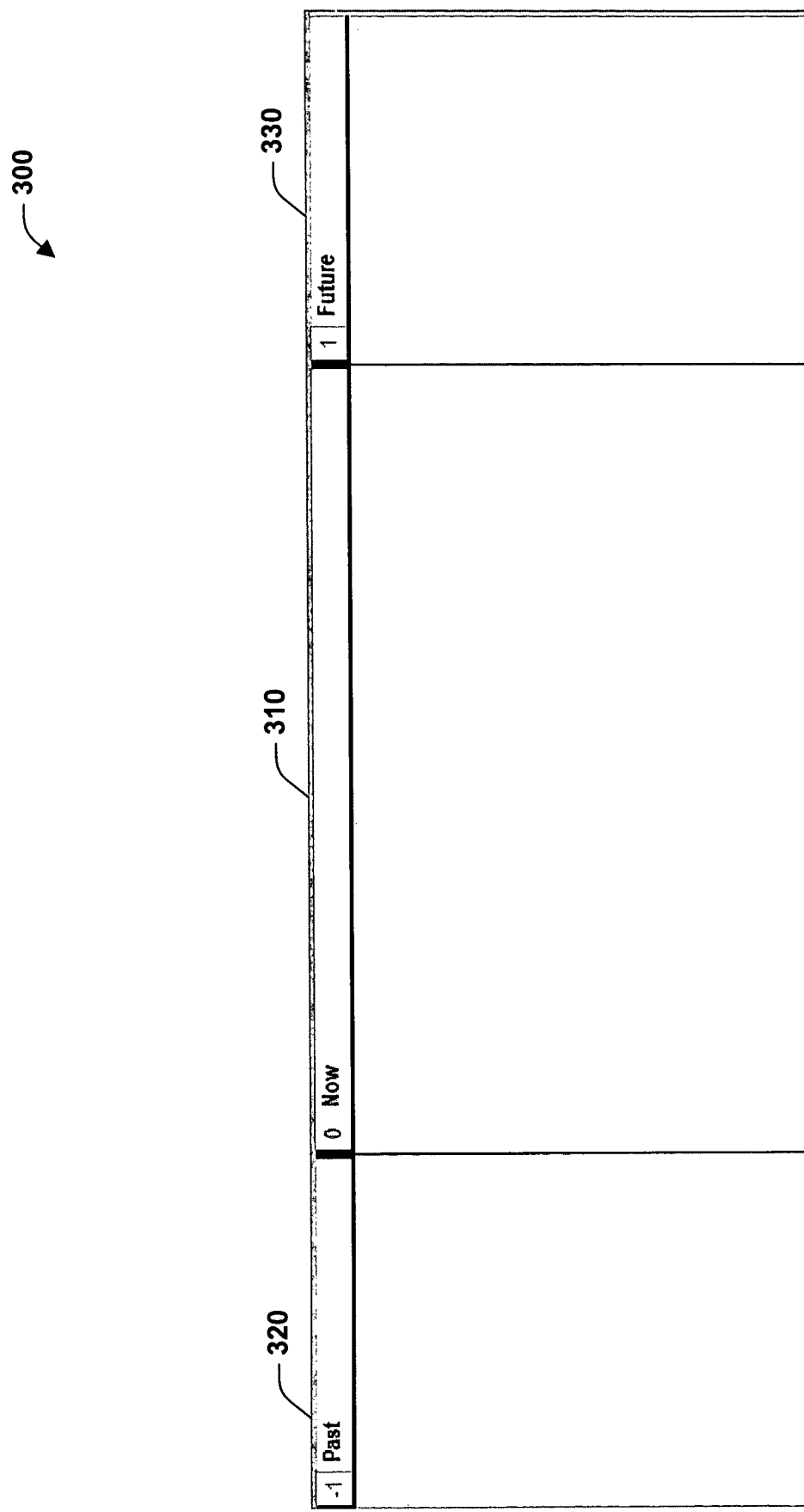
FIG. 3 is a diagram of a display component workspace in accordance with an aspect of the subject invention.

The display component 210 provides a timeline interface amenable to specifying temporal constraints. Display component 210 supports a sketch experience to an authoring task. More specifically, the display component allows users to only specify information that they desire rather than specifically specifying exact literal constraints as is conventionally done. According to one aspect of the present invention, display component 210 can comprise a plurality of workspaces or sections such as past, present, and future rather than a single uniform linear timeline. Turning briefly to FIG. 3, an exemplary display component workspace 300 is depicted. Workspace 300 has three broad sections or areas 310, 320, and 330. Section 310 corresponds to the "present" or "now" section that contains a subset of an application which a user can be currently working on. Sections 320 and 330 correspond to past and future areas, which can contain simplified representations of events that happened before or after the current action, respectively. Hence, past section 320 and future section 330 provide a context and can also serve as navigational aids for a user during application development. According to an aspect of the subject invention, the present section 310 can be designated the editable area which enables a user to modify, add, or delete objects therein. However, the user can also utilize objects from the past and future areas 320 and 330 in the present area 310, for example by cut and paste, copy and paste, drag and drop and the like.

Furthermore, the past and future sections 320 and 330 can also be employed to facilitate specification of non-causal relationships (e.g., temporal constraint). In general, an event A is non-causally related to an event B if A must finish before B starts, but B is not required to start after A is finished. For example, suppose that an application needs to load a special file prior to printing for the first time. There are many ways that a user could tell a system to print (e.g., buttons, menus, command line . . . ). In a conventional system, the user would have to put in code before each of these checks to see if the special file is loaded before calling the print operation. This method is tedious and prone to error as new methods of printing are added or if the procedure needed to load the file changes. In the present invention, however, a user could simply specify that the load special file action's end time has to be before the print action's start time. The system can then enforce this rule no matter how print is activated.

Figure 4:
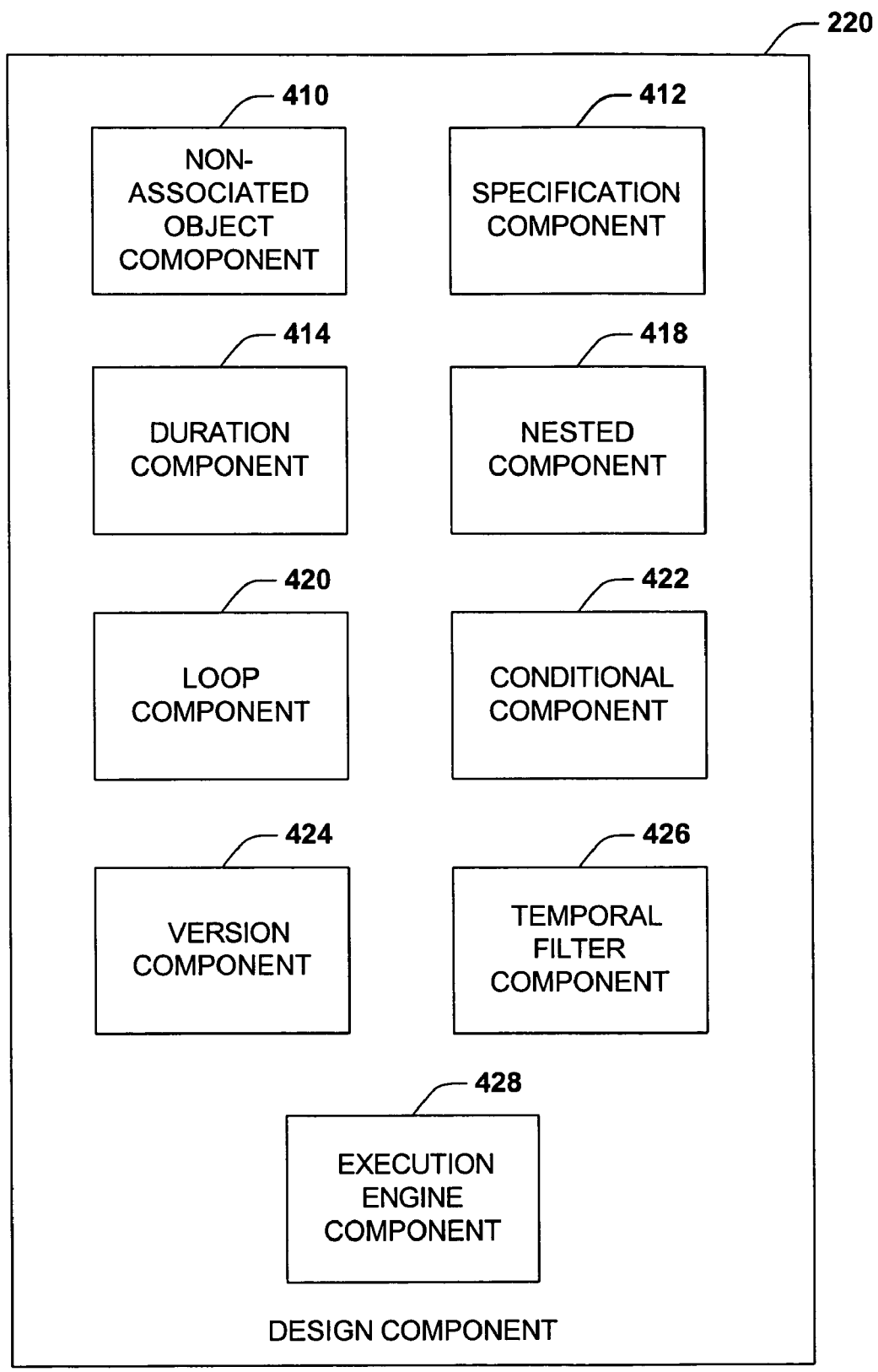
FIG. 4 is a block diagram of a design component in accordance with an aspect of the present invention.

FIG. 4 depicts a design component 220 in further detail in accordance with an aspect of the subject invention. Design component 220 includes non-associated object component 410, specification component 412, duration component 414, nested component 418, loop component 420, conditional component 422, version component 424, temporal filter component 426, and execution component 428. Each component will be explained hereinafter and an exemplary representation thereof presented. In accordance with an aspect of the subject invention a user can specify object relationships, associations, and dependencies based, inter alia, on the nature of the object and its position with respect to other objects. To facilitated understanding of the present invention, exemplary graphical user interfaces (GUIs) or graphical user interface object layouts are provided hereinafter to illustrate one manner in which object relationships can be specified. These GUIs feature very simple graphics for the sole purpose of clearly describing several aspects of the subject invention. It is to be appreciated that there are many other representations that will be apparent to those of skill in the art upon reading this specification which are also considered to be within the scope and spirit of the present invention.

Non-associated object component 410 receives specified objects that are not associated or related to one or more other objects. As described supra, one aspect of the subject invention provides users with a sketch experience to object authoring, which allows users to specify as much information as they desire. The "missing" information can subsequently be inferred or supplied by other system components. This approach gives users the maximum ability to explore, create variations, make adjustments, as well as change their minds. Non-associated objects can be executed as determined by non-associated object component 410. For example, non-associated objects can simply be executed randomly. Alternatively, non-associated objects can be executed according to a utility-based analysis.

Utility-based analysis can optimize the execution order of a series of events. As noted supra, a user can specify a series of constraints loosely. Thus, any number of orderings for events can satisfy the constraints. Systems can choose one of the orderings as the favored ordering. For example, one system could choose to optimize the ordering of events for maximum performance. To accomplish this goal, the system can utilize heuristics or a pool of knowledge about the executing system of which a user who specified the constraints does not know. For example, the system could take into account cache coherency, data throughput, number of number of processors, and available memory to name but a few.

According to one aspect of the subject invention utility-based analysis can employ technologies associated with facilitating inference and decision making under uncertainty and optimization of expected utility and/or minimization of expected costs. Thus, statistical inferences can be performed with models constructed by hand, from data with machine learning methods, or by a mixture of machine learning and human assessment. Such models can be used in conjunction with deterministic policies where, depending on the context or task at hand, an inferential rule or deterministic rule is used. A variety of machine learning systems/methodologies including Bayesian learning methods that search over alternative dependency structures and apply a score (such as the Bayesian Information Criteria, etc.), Bayesian classifiers and other statistical classifiers, including decision tree learning methods, support vector machines, linear and non-linear regression, and neural network representations, can be employed to build and update inferential models that can be utilized to determine the execution order of events.

Figure 5:
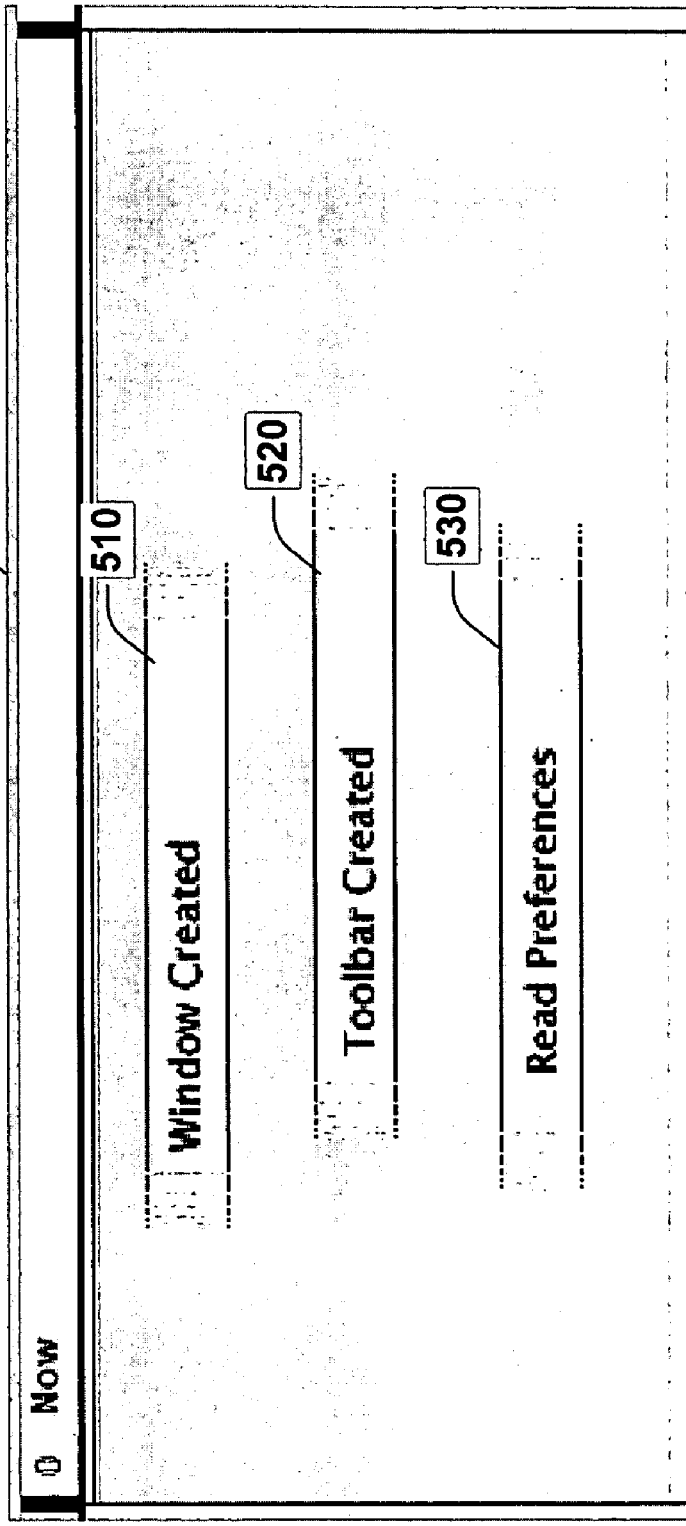
FIG. 5 is a diagram of a graphical user interface for adding objects and events to an application in accordance with an aspect of the subject invention.

Turning to FIG. 5, a graphical user interface object layout section 500 is depicted for adding events and associated objects in accordance an aspect of the subject invention. As described supra, a user can modify, add, or delete objects and associated events from present section or area 310. For example, assume a user wants to create a window, create a tool bar and read preferences. To accomplish this task a user can simply enter objects associated with these events into the "present" or "now" section 310 of the workspace 300 (FIG. 3). According to an aspect of the invention this can be accomplished by adding graphical bars 510, 520, and 530 specifying window created, toolbar created and read preferences, respectively. These objects can be employed to facilitate specification of information such as event start and/or end time as well as event duration. In conventional programming languages, a user specifies a series of instructions to follow and the computer executes them in order. For instance, in writing a program to empty a dishwasher, a programmer might say "remove the first glass, remove the second glass . . . remove the last glass, remove the first plate, remove the second plate . . . remove the last plate, remove the first spoon . . . ." However, despite the fact that the user has specified these in order, in reality, the user does not care about the order. The only thing that matters is that all the steps are completed. Conventionally, there is no way to indicate this to the computer executing the program. It might be more efficient for the computer to empty the plates before the glasses, for example, but the computer has no way of knowing if the order matters. Therefore, a computer cannot optimize this sequence. According to an aspect of the subject invention, information concerning event start and stop times and event duration can be communicated with a particular object or type of object. For example, if the objects are rectangles or bars than fuzzy edges on the bars can indicate an unspecified time. Fuzzy edges on at the beginning of the bar can indicate an unspecified start time, while fuzzy edges on at the end of the bar can indicate an unspecified end time and/or duration. In GUI 500, three events represented by rectangular bar objects are specified in the present workspace 310 with fuzzy edges. This specification denotes that a user would like to execute these three events, but reveals nothing about the relative orders or durations. Thus, the system via design component 220 (FIG. 2) has the freedom to execute such events in any order it determines (e.g., optimal execution order utilizing heuristics). Of course, many times a user does care about the sequence of events. Consequently, the present invention facilitates specification of hard start and/or end times for events.

Figure 6:
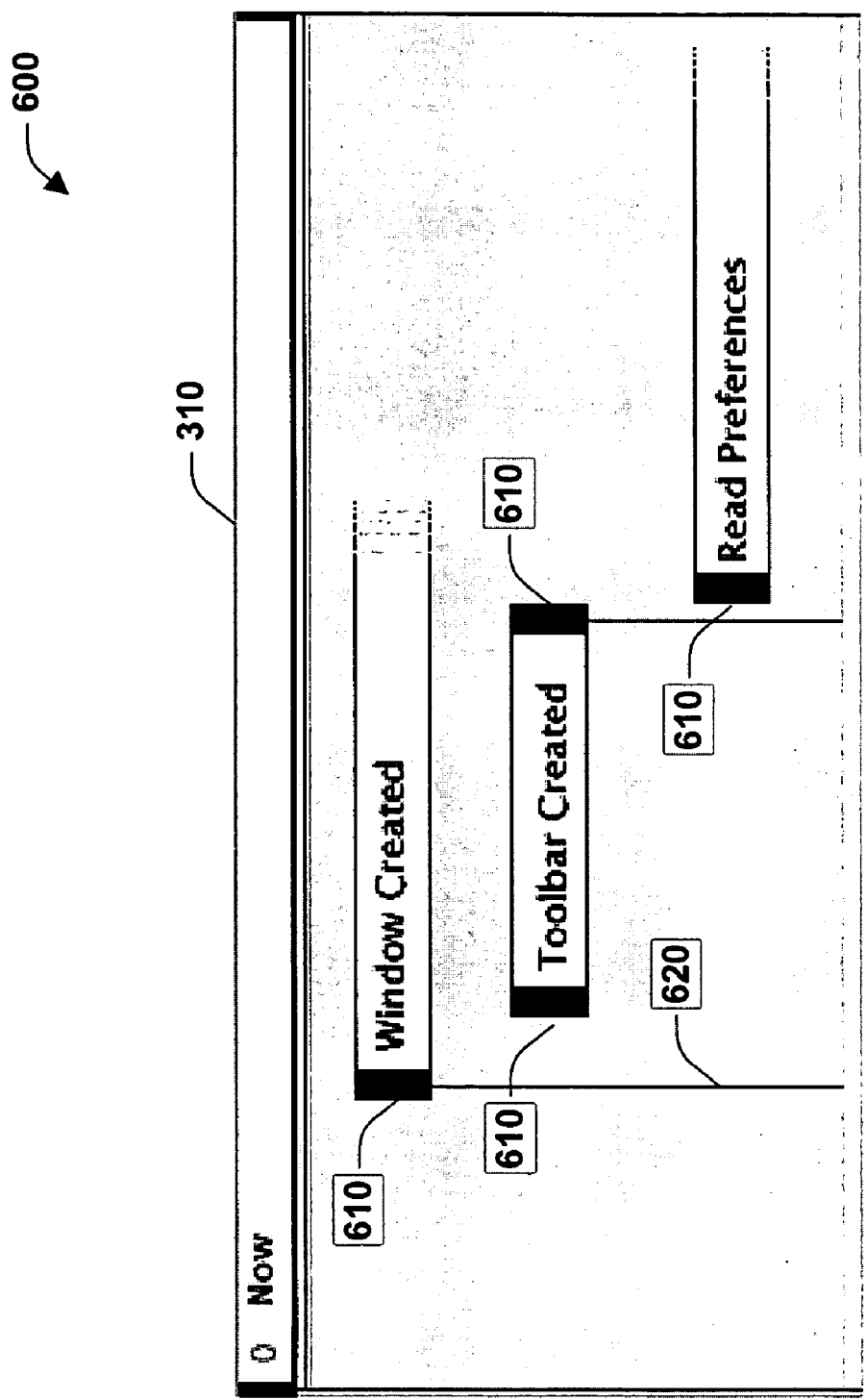
FIG. 6 is a diagram of a graphical user interface for specifying hard start and/or end times for events in accordance with an aspect of the subject invention.

Turning back to FIG. 4, specification component 412 receives specifically designated start and/or stop times for events associated with specifically designated objects. While the subject invention supports loosely specified events there are times when authors may desire to specifically specify a start time, a stop time, or both a start and stop time. For instance, in animation a user may desire to specify a particular time for which an animation is to start and stop. FIG. 6 illustrates graphical user interface object layout 600 for specifying hard start and/or stop times. One of many ways of specifying hard or specific start and/or stop time is by utilizing hard bold edges 610 as illustrated by graphical user interface 600. Additionally vertical lines 620 can be employed along with hard bold edges 610 as guides for proper time and sequence specification amongst a plurality of objects. As shown in GUI 600, the hard bold edges 610 and in combination with the position of the objects relative to one another indicate that window creation starts and then toolbar creation starts. Once and only once the toolbar creation has ended, the preference reading can be started. Note that despite specifying some sequence information GUI 600 does not reveal how long these events might take to execute. For instance, window creation could end before or after toolbar creation starts. Thus the present invention enables a user, in effect, to specify temporal constraints rather than exact literal times. Of course, the present invention also allows a user to specify exact durations and even permits a user to work with a combination of the two.

Figure 7:
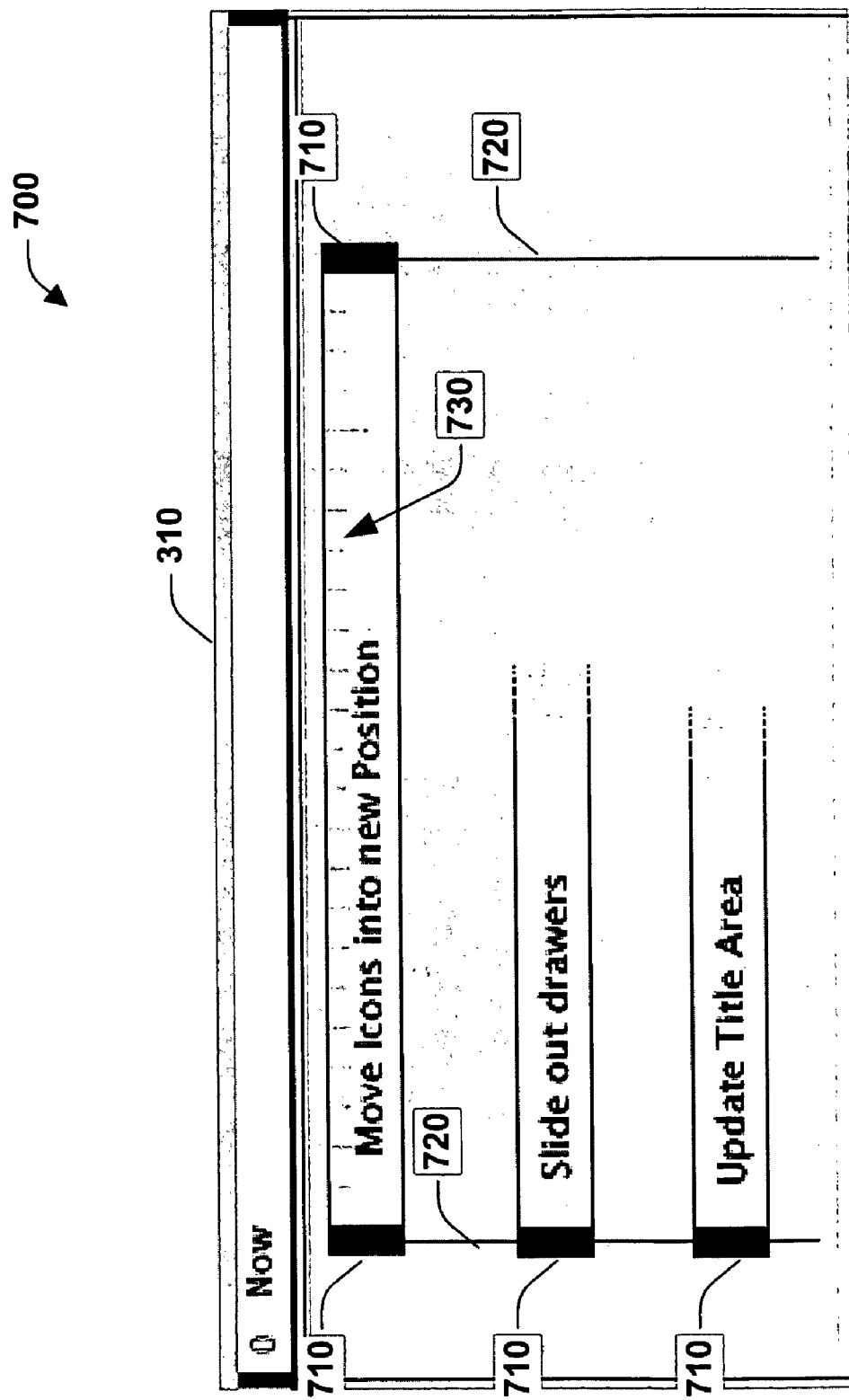
FIG. 7 is a diagram of a graphical user interface object layout illustrating specific and nonspecific durations in accordance with an aspect of the subject invention.

The design component 120 of FIG. 3 also includes a duration component. Duration component 314 receives or retrieves information from objects relating to event duration. Durations can be specifically specified or alternatively left undefined (nonspecific duration). For example, a user can specify that an event last for 10 seconds or alternatively simple specify that the event such be executed. FIG. 7 is a diagram of a graphical user interface object layout 700 showing a combination of specific and nonspecific durations in accordance with an aspect of the subject invention. Graphical user interface 700 illustrates a user specification of an animation of icons that lasts exactly one second indicated by the tick mark pattern 730, the hard bold bar edges 710, and the guidelines 720. At the same instance the animation starts, two other events or actions happen—the drawers slide out and the title area is updated, as indicated by the depicted objects shown with similar names. Both of these events, "slide out drawers" and "update title area," have nonspecific durations, thus they may be either longer or shorter than the specific duration icon animation.

Figure 8:
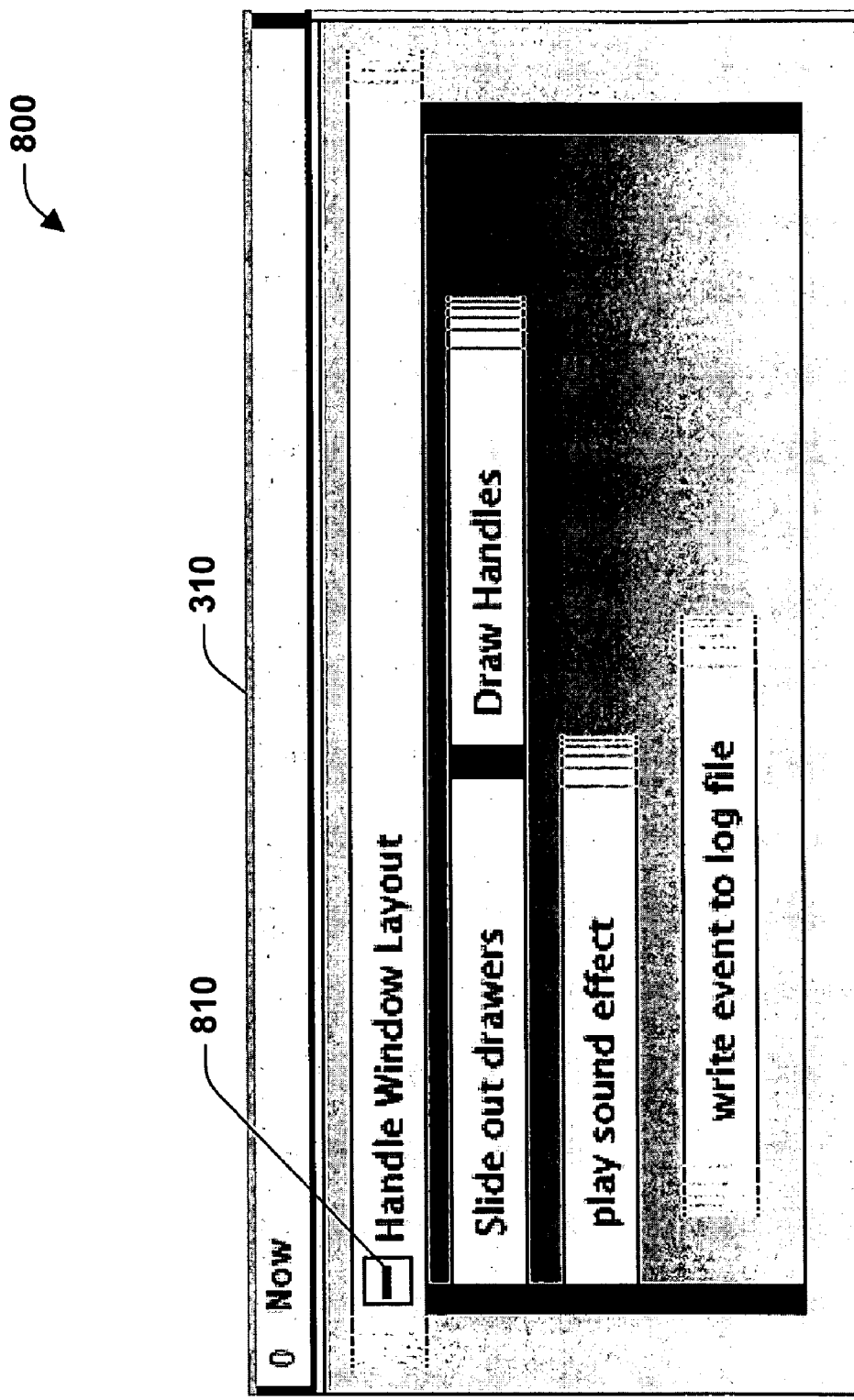
FIG. 8 is a diagram of a graphical user interface object layout illustrating a nested object structure in accordance with an aspect of the present invention.

Events are themselves small timelines and can have events inside themselves. The design component 220 (FIG. 4) provides for receiving nested objects via nested component 418. Nest component 418 receives information regarding objects that are embedded in other objects information. Embedded or nested objects can be specified in series, in parallel hierarchical or otherwise. Furthermore, according to an aspect of the invention nested events can refer to the start and end time of their parent as specific events even when the parent has no specified end time itself. FIG. 8 illustrates a graphical user interface object layout 800 representing a nested or hierarchical object structure in accordance with an aspect of the subject invention. The hierarchical structure representing an event timeline is illustrated as a handle window layout event which as has been expanded by activation of the expansion box 810 (e.g., by a mouse click). At the beginning of this event the drawers slide out and the sound effect starts to play at the same time. Once the drawers are done sliding out then the handles are drawn. Additionally, at some unspecified point an event is written to a log file. All of these events must be completed before the handle window layout event can be considered done. However, as long as the specific constraints are satisfied, the system is free to schedule the tasks in whatever order it wants. Thus, here the log file can be written simultaneously with the start of the slide out draws action, upon termination of execution of all other nested events, or sometime in between. Thus, nested timelines are very powerful because the sequencing and duration of all the items inside the event can be adjusted simultaneously by simply adjusting the parent itself. For instance, a user can specify behavior that says "Keep this watch ticking for as long as it takes to load the file," without actually having to specify how long it takes to load the file. This cannot be directly specified in conventional environments and has to be hard-coded in an error-prone fashion.

Figure 9:
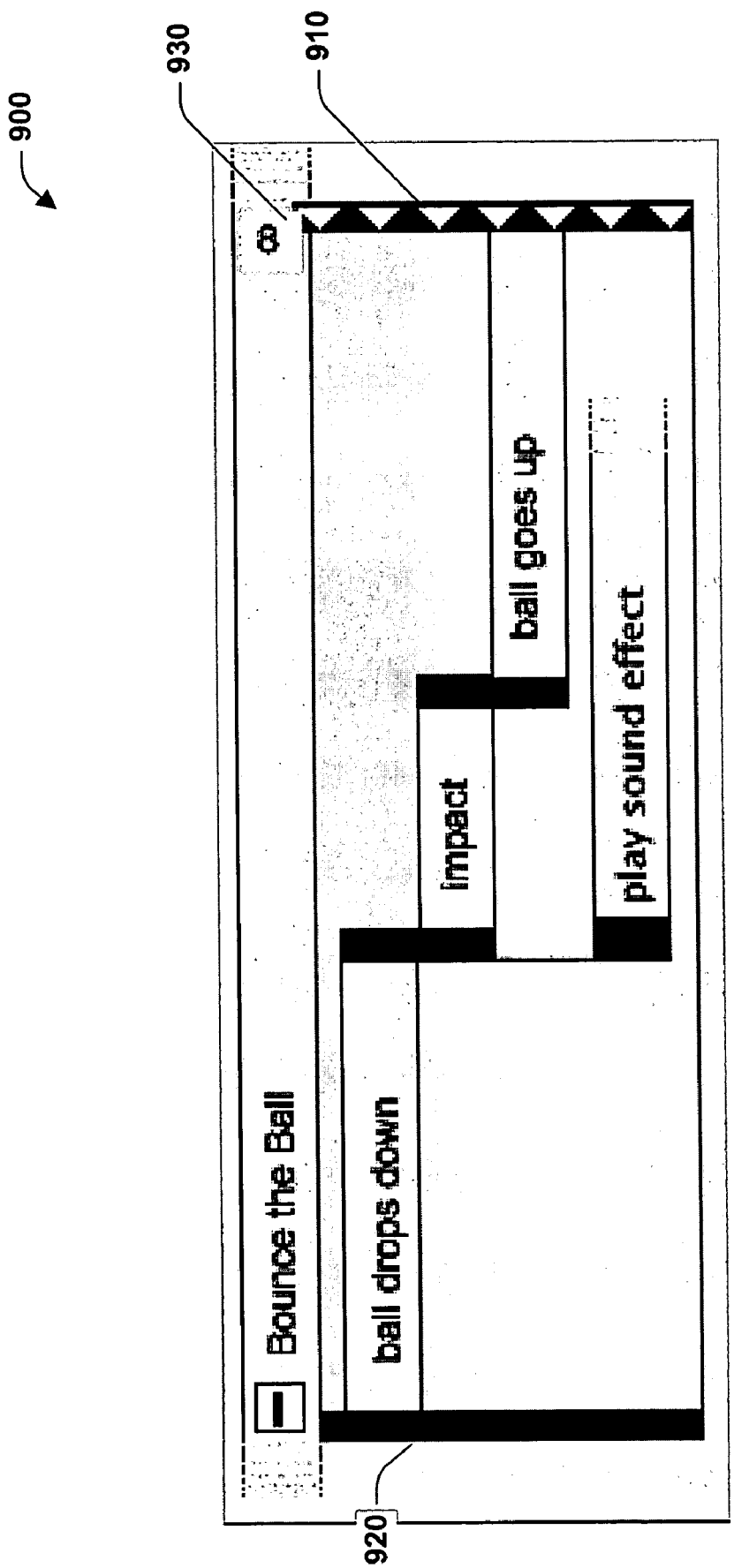
FIG. 9 is diagram of a graphical user interface object layout illustrating an exemplary loop specification in accordance with an aspect of the subject invention.

The loop component 420 of design component 220 (FIG. 2) receives data regarding one or more objects and associated events that continuously execute for a specified number of times or until an exit condition is met, for example. Thus, loops can be considered an example of an arbitrary event constraint. One constraint on an event is when the event ends. According to the present invention, a default constraint can specify that a loop is over or ends when its sub-events have been completed. However, this default constraint can be changed to an arbitrary constraint. A specified looping structure is a very power construct in that it allows a designer to specify one or more events once and the number of times the event or events should execute rather than having to repeatedly specify the same set of events over and over again. Turning to FIG. 9, a graphical user interface object layout 900 is depicted illustrating an exemplary loop specification in accordance with an aspect of the subject invention. As discussed above, typically an event is considered to be complete if all of its contained events are complete. However, there are cases where a user wants an event to be executed continuously. This type of programmatic structure is a loop. A looping event can be specified according to an aspect of the invention by placing and an operational object such as badge 910 on the right edge of an object or group of objects and a hard edge 920 on the left. Additionally, a loop indicator 930 can reside at the top of the badge 910 to further denote that objects and associated events are to be looped and the number of times they will loop. At runtime, this can also display how many times the loop as occurred. A group of objects associated with events related to an animation of a bouncing ball is illustrated as an exemplary loop. First the ball drops, it impacts, and simultaneously a sound is played. Then the ball goes back up again. The loop indicator 930 shows that this ball bouncing sequence loop is to be executed an infinite number of times. However, it should be noted and appreciated that the loop can be specified to exit if it encounters some exit condition while executing.

Figure 10:
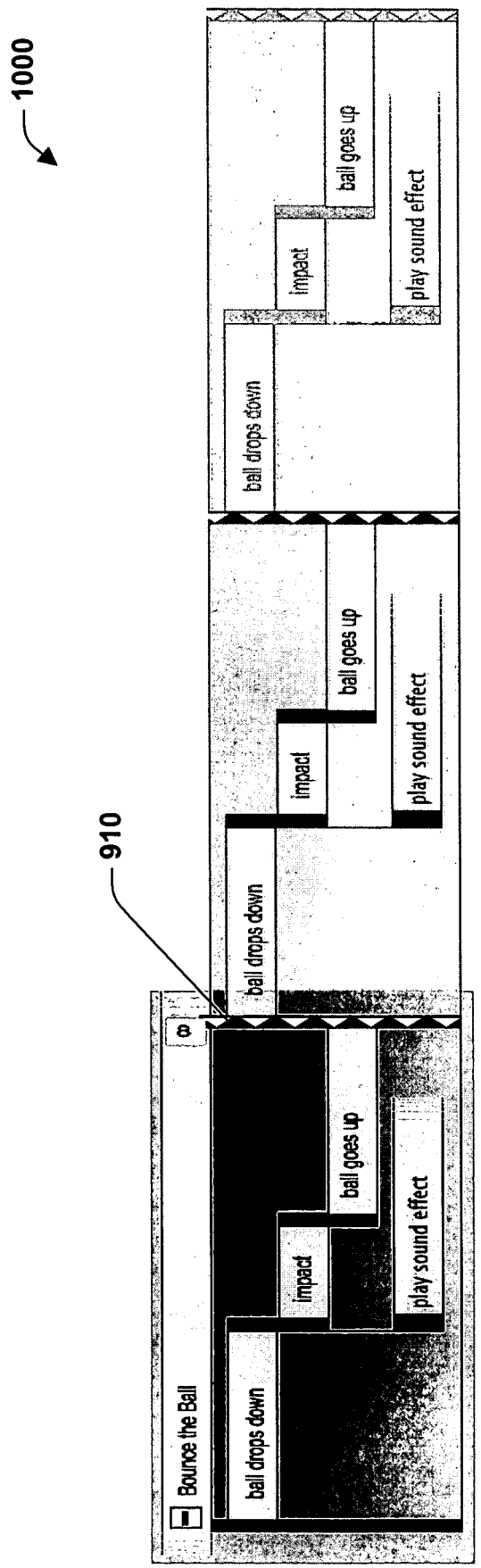
FIG. 10 is a diagram of a graphical user interface object layout depicting an expanded loop in accordance with an aspect of the subject invention.

Turning briefly to FIG. 10, a graphical user interface object layout 1000 is illustrated. According to another aspect of the invention, by clicking on the badge 910 (e.g., using a mouse, stylus . . . ) the loop can be unrolled or rolled back up again. For instance, when the loop is unrolled the first iteration can be displayed normally, while all subsequent iterations can be shown in 50% transparent. In the case of an infinite loop the first few iterations can be shown and a user can drag the right edge out to see additional iterations. Unrolling a loop is advantageous at least because it provides a way to synchronize events with specific iterations of the loop.

Sometimes a user may want to expose a particular point in time, which he/she knows might be a significant point of temporal reference for other parts of the system. For instance, in a jump animation the point where the character's feet touch the ground might be such a point. The present invention allows users to specify triggers for these events. Later, in system execution the user can then refer to these triggers. The same trigger can be fired by many different parts of the system. For instance, every jump animation can fire the same "impact" trigger. This allows a designer to synchronized a sound effect to an impact trigger, and automatically have that sound play or fire whenever any impact occurs. According to an aspect of the subject invention, a trigger can be represented by attaching a solid triangle or badge to an object naming the trigger (see FIG. 10). Closely related to triggers is the notion of conditionals.

Figure 11:
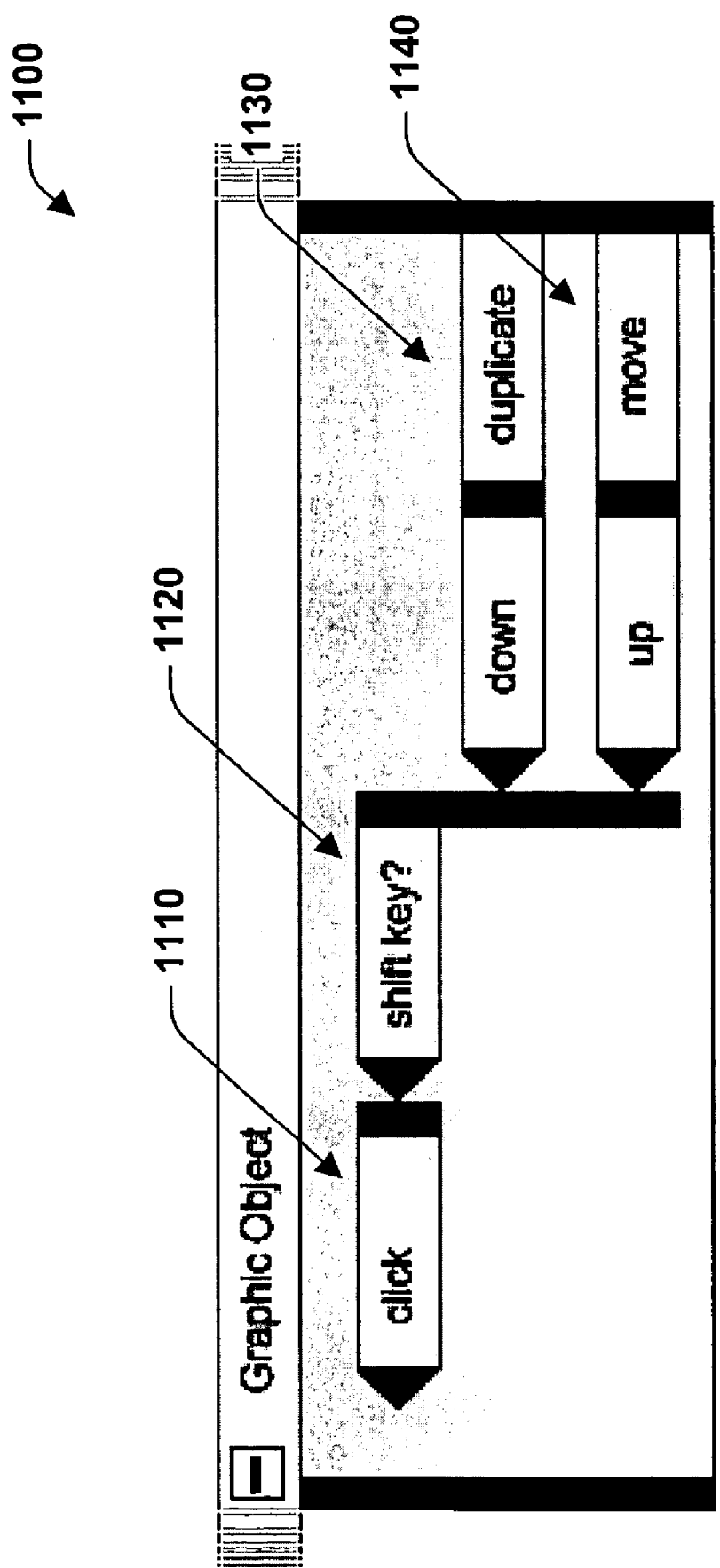
FIG. 11 is a graphical user interface object layout depicting the use of conditionals in accordance with an aspect of the subject invention.

A conditional is an event that executes only after a trigger is fired. Design component 220 (FIG. 4) provides a conditional component for receiving data regarding conditionally specified and associated objects. Referring to FIG. 11, a graphical user interface object layout 1100 is illustrated depicting the use of conditionals in accordance with an aspect of the subject invention. As illustrated, conditionals can be represented utilizing an operational object such as a badge (e.g., triangle) before an object associated with an event with the trigger's name in it. Furthermore, a solid bar structure can extend from the end of a trigger to indicate a particular conditions associated with the trigger. There are generally two main contexts where conditionals are used. The first is for handling system events including but not limited to mouse clicks. These are standard triggers such as described above, and can be optional events. The second is for control structures similar to "if . . . then" or "select . . . case" statements in conventional programming languages. In the present invention control structures can be specified by creating a short-term trigger that evaluates some expression and then branches or jumps on the result. Both types of conditionals are illustrated in GUI 1100. First, a trigger is activated on a mouse click 1110. Subsequently, the procedure tests whether the shift key is down or up 1120. If the shift key is down then the item clicked on is duplicated 1130. If the shift key is up then the item clicked on is moved 1140.

Figure 12:
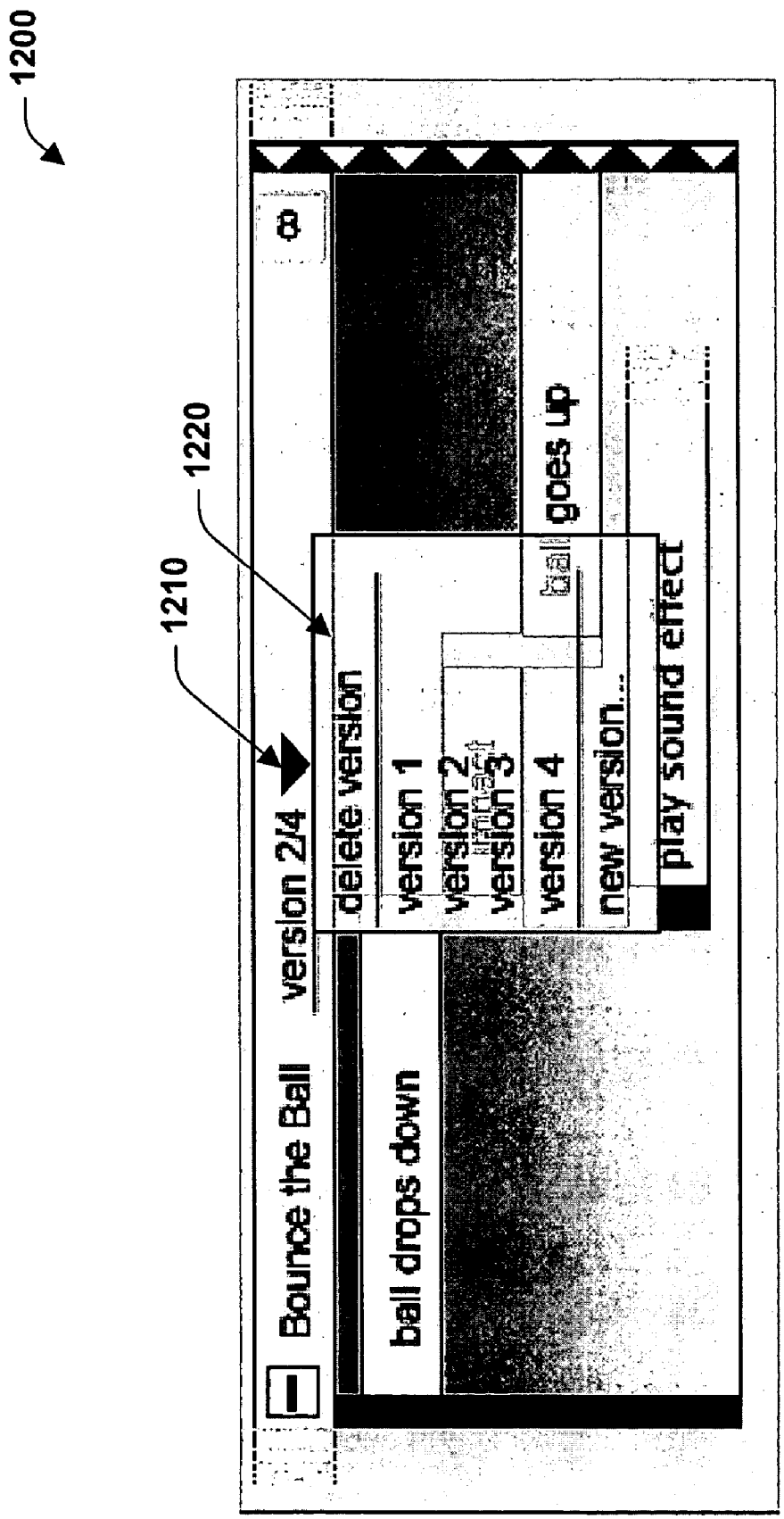
FIG. 12 is a versioning graphical user interface in accordance with an aspect of the present invention.

The present invention can also support versioning of objects. To facilitate such functionality, design component 220 includes a versioning component 424. Version component 424 retrieves or receives information regarding one or more object versions. Versions can represent various algorithms for accomplishing a specified action or event. Different versions can be defined, for example, by using a context menu on an object. Turning to FIG. 12, a versioning graphical user interface object layout 1200 is illustrated in accordance with an aspect of the subject invention. GUI 1200 depicts a hierarchical nested looping object. A button 1210 resides on the object "Bounce the Ball." When activated, for example by clicking on button 1210 with a mouse, a drop down menu 1220 can be displayed. Drop down menu 1220 allows a user to create a new version, delete a version, or select a previously created version. This fine-grained versioning makes it easy for a designer to experiment with several different variations of an object. It is also handy for built-in content creation tools (e.g., morphing), which can generate several possible outcomes. Rather than force a designer to pick their result up front, the versioning menu can emit all possible versions and let a user see them all before deciding which to select.

Figure 13A:
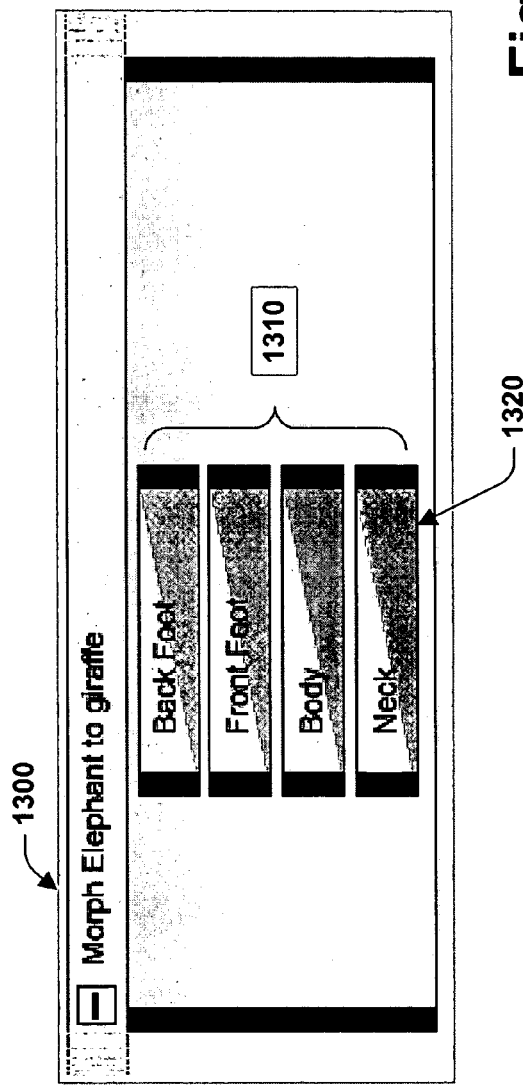
FIG. 13a is a diagram of a graphical object layout in accordance with an aspect of the subject invention.
Figure 13B:
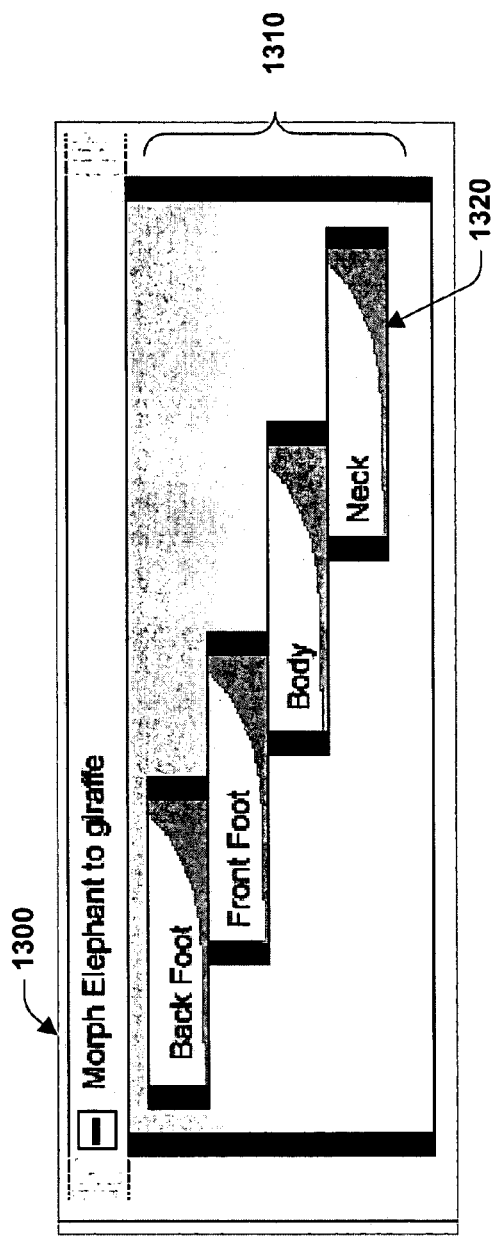
FIG. 13b is a diagram of a graphical object layout in accordance with an aspect of the subject invention.

Designers often desire frame accurate control of animation programs to perform subtle time effects such as acceleration, ease in/out or jitter. One particular situation where this is useful is in shape morphing which is a popular technique in computer animation where one shape morphs or changes into another shape over time, such as an elephant to a giraffe. Presently designers are demanding much finer control over timing and sequencing then is conventionally possible. They also want to be able to insert other animations into a morph sequence. For example, an elephant might first have its legs change, then it might turn its head to look at its new legs, and then have its head change. To satisfy designer demand the present invention provides an interface with fine control over timing and sequencing. At least a portion of this control applies a temporal filter to an event. A temporal filter maps one relative time to another. Every event can have a temporal filter associated with it, the default being a linear filter. Accordingly, the design component 220 (FIG. 4) provides a temporal filter component 426 for receiving or retrieving mapping data. Turning to FIG. 13*a* a graphical user interface object layout with a temporal filter is illustrated in accordance with an aspect of the subject invention. As shown, an object 1300 is specified for animating or morphing an elephant to a giraffe. The object 1300 is expanded to show sub-objects or nested objects 1310. A temporal filter can be applied to an event associated with an object to provide finer control of timing. A temporal filter provides a mapping. Hence, given a time from 0 to 1, where 0 is the start of the event and 1 is the end, a temporal filter returns a new time. Depending on the filter, designers may also have additional properties to set such as for jittering, acceleration, reversal and the like. Furthermore, a powerful aspect of the filtering of the subject invention it that it can be applied to an event and then it can affect any sub-events of that event, even if the author has not specified the sequencing of the sub-events. For example, an author can have an event A that contains sub-events B, C, and D. The author can subsequently apply a filter to that performs acceleration, so that each sub-event happens more rapidly than the previous. But, the author could leave the ordering of the sub-events unspecified in accordance with an aspect of the invention. At execution time, the system may then decide to execute the events in the order C, B, D. The filter, however, would still apply, and C would execute slowest and D fastest. Temporal filter properties can be adjusted using, among other things, a menu, or a wizard, or alternatively properties can be adjusted manually (e.g., using a mouse). The specified temporal filter properties can then be graphically represented as subpart of an object, such as filter indicator 1320. Filtering and object layout can work together to let a designer quickly customize behaviors. Object layout refers to the relational position of one or more objects to other objects (e.g., stacked, in series, staggered . . . ). Object layout can be specified manually, for instance by dragging objects to particular locations or utilizing a menu automatically positions selected items (e.g., stacked, in series, staggered . . . ). In FIG. 13a, the object layout specifies parallel execution of the morphing events for each sub-object representing back foot, front foot, body, and neck associated with morphing an elephant into a giraffe. Furthermore, the filter indicator 1320 denotes that the execution of each sub-object event will be more or less linear. Thus, in morphing an elephant to a giraffe, each piece of the animal will change at the same time and at the same rate. Turning to FIG. 13b, an alternative graphical object layout is depicted. This object layout shows partial object overlap. Thus, the sub-objects representing animal parts (i.e., back foot, front foot, body and neck) will be executed in a staggered series. Furthermore, the filter indicator 1320 indicates that execution of each sub-object should be accelerated over time. Accordingly, at runtime each body part will pop into its new shape one after the other.

Returning briefly to FIG. 4, it should be noted that design component 220 can also include an execution component 428. Execution component utilizes, among other things, information retrieved from other design component 120 components (described supra) relating to object associations and/or disassociations to generate an executable program. The order of execution of the executable component is based in part on the specifically specified object relationships and in part on an order determined by the execution component. For instance, events associated with objects that are not associated with any other objects (e.g., no specified start or stop time) can be executed randomly or via a utility-based analysis.

Referring back to FIG. 2, it should be noted that interactive event ordering system 200 includes a policy component 230. Policy component 230 provides a mechanism for specifying particular details about object or event execution and editing thereof. For instance, predefined rules can be specified as to the order of execution of particular objects and associated events. According to one policy particular objects can be executed sequentially. For example, "A" happens after "B." According to another policy objects can be executed concurrently or simultaneously. For instance, "A" and "B" happen at the same time. In addition, policy component 230 can also specify how objects can be edited, for instance, how to add, delete or modify objects.

Furthermore, it should be noted that although several examples of temporal constraints (e.g., loops, conditions, temporal filters . . . ) have been presented herein, they are merely exemplary constraints to facilitate a clear understanding of the subject invention and not meant to limit the scope of the invention in any way. In general, one can utilize temporal constraints to specify execution of events. Accordingly, it should be clear that many other constraints are possible and that present disclosure is not meant to be an exhaustive list.

Event ordering system 200 also includes a query component 140. Query component 140 enables a user to view particular objects of interest in an easy and powerful manner. Upon initiation of a query, query component 240 retrieves the particular objects from the display component 210. The system 200 of the present invention lends itself to querying as it normally only displays a subset of events at any given time. This enables a user to scope or limit the view to the events with which a user is presently concerned. Thus, objects associated with events that meet the query criteria can be located and displayed in temporal order as a subset of events. For example, one could view how two buttons interact. Furthermore, query component 240 can also be utilized with respect to casual events. Because the ordering for every event in the system is known, for a given subset of events it is possible to determine which will happen before and after a queried event. This is an extremely powerful feature in that it can provide context for the present work. The user can thus focus on just a subset of the objects he cares about, and the query component can then automatically generate the context for the work.

In particular, the event ordering system of the present invention can use the built-in constraint system to determine which events would come before or after the set of events that match a current temporal query. The results can then be displayed in the "past" and "future" areas of a display component. One of the purposes of the "past" and "future" areas is to provide a user additional context about their current view. For example, a user making an icon layout animation can see in the past all of the events which might lead to the layout event being called (e.g., adding an object, deleting an object, changing the window size, changing the icon size . . . ). This is an important aspect to the usability of the timeline object authoring system of the present invention. Without this "temporal context," it is easy for users to get lost in their work. In addition to context the past and future areas provide an easy way of specifying a more general query. By clicking on an event in the past or future, the user can increase the scope of the current temporal query to include this event. For instance, in FIG. 14a, a user is working within a deeply nested timeline for writing data to a log file within a window layout event 1410. By clicking on the window layout event 1410, the display can be redrawn to reflect this higher level view of the system as is shown in FIG. 14b. This is a quick an easy way for a user to navigate the timeline of the present invention while avoiding too much visual clutter.

Figure 15:
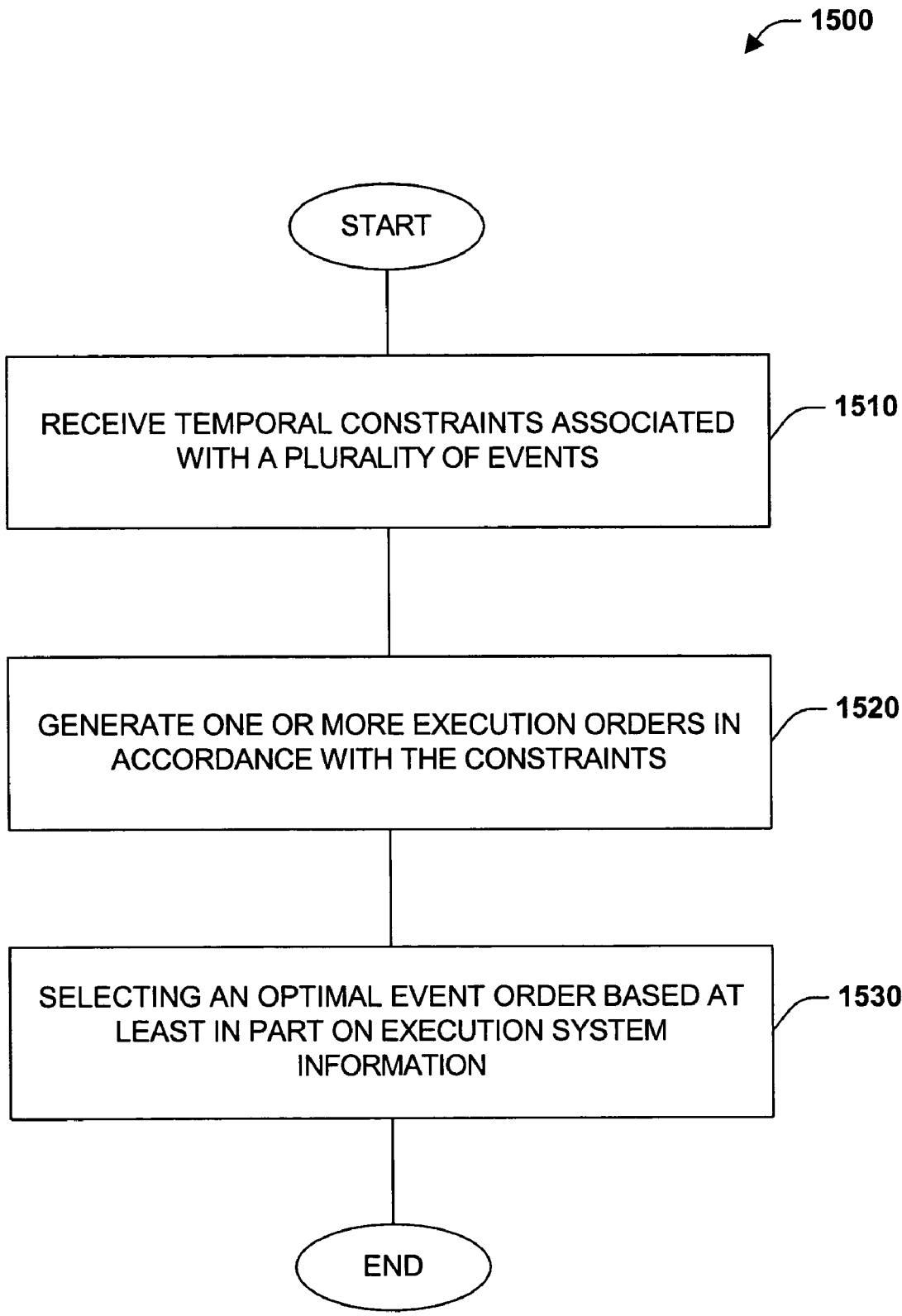
FIG. 15 is a flow chart diagram illustrating a method of ordering events in accordance with an aspect of the subject invention.
Figure 16:
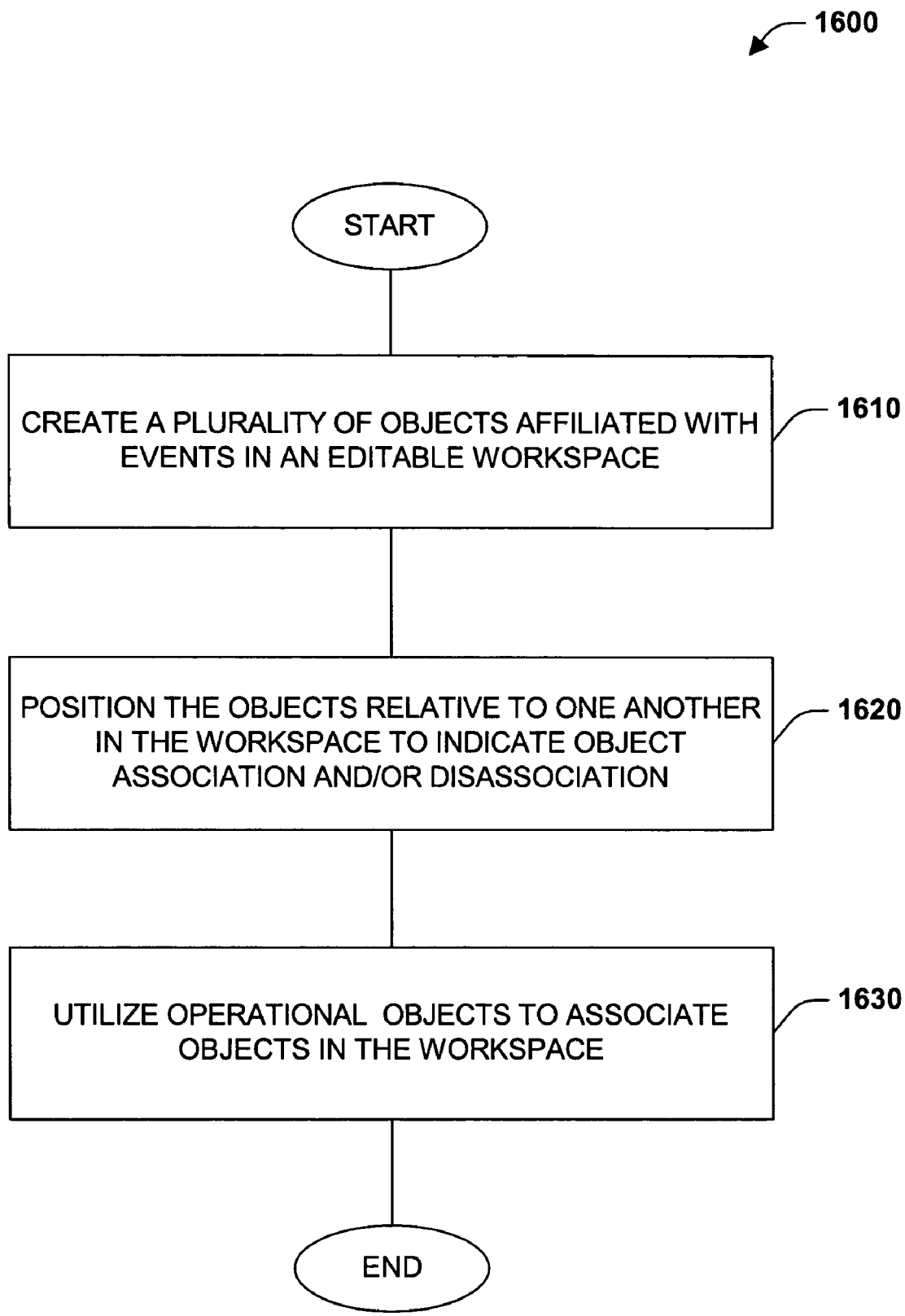
FIG. 16 is a flow chart diagram depicting a method of interacting with an event ordering system in accordance with an aspect of the subject invention.
Figure 17:
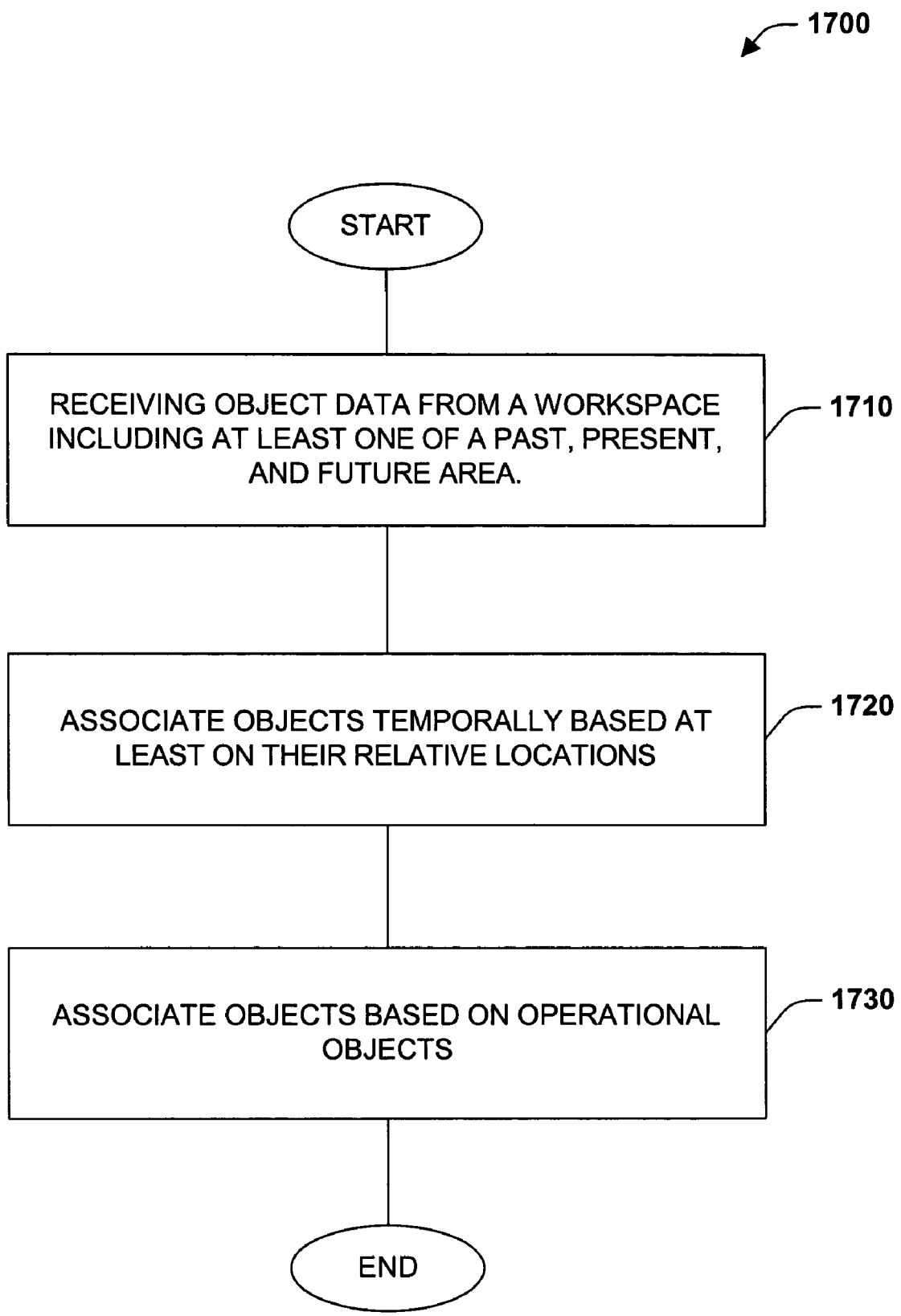
FIG. 17 is a flow chart diagram illustrating a method of associating objects in accordance with an aspect of the subject invention.

In view of the exemplary system(s) described supra, a methodology that may be implemented in accordance with the present invention will be better appreciated with reference to the flow charts of FIGS. 15-17. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Turning to FIG. 15, a flow chart diagram 1500 of method of ordering events is illustrated in accordance with an aspect of the subject invention. At 1510, temporal constraints associated with a plurality of events are received. Temporal constraints can include but are not limited to start times, stop times, and event duration. Subsequently, one or more event execution orders are generated in accordance the received constraints, at 1520. Then, at 1530, an optimal event order is selected based on execution system information such as available memory, cache coherency, number of processors and the like.

Turning to FIG. 16, a flow chart diagram of a method of interacting with an object authoring system 1600 in accordance with an aspect of the present invention is depicted. At 1610, a plurality of objects associated with events are created in an editable workspace. For instance, the objects can be created in the present area of a workspace containing past, present, and future areas, the past and future areas providing context for the present area. Subsequently, at 1620 the objects can be arranged relative to one another in the workspace to indicate association and/or disassociation. For example, the objects can be position horizontally next to each other to indicate sequential execution thereof. Alternatively, the objects can be positioned vertically next to each other in a layered fashion to denote concurrent or simultaneous execution of the objects. In another example of associated objects, the objects can be nested in other objects to indicate that the sub-objects need to finish executing before the parent object can be deemed finished executing. Disassociated objects can be represented by providing sufficient space between the objects, so that they are not positioned horizontally next to each other or layered on top of each other. Additionally, at 1630 operational objects can be utilized to further delineated object association and relations. For instance hard edge lines can be used to specify hard start and/or stop times for execution. Furthermore, loop badges, trigger badges, conditional badges, as well as version components and temporal filter components can be utilized to specify object relations.

FIG. 17 is a flow chart diagram illustrating a methodology of object association 1700 in accordance with an aspect of the subject invention. At 1710, object data is retrieved or received from a workspace including at least one of a past present and future area. At 1720, objects are associated temporally based at least in part on their relative locations to other objects. For instance, if the objects are stacked vertically on top of each other this can be used to associate the stacked objects for purposes of concurrent event execution. Alternatively, if the objects are contiguous vertically, this can be used to indicate that these objects should be executed sequentially. Objects that are nested inside other objects can be associated such that the nested objects need to be completed before the parent object can be deemed finished executing. Additionally, operational objects can also be utilized to associate objects at 1730. For example, hard edge lines indicating specific start and/or stop times relative to other objects, loop badges, trigger badges, conditional badges, version components, and temporal filter components.

Figure 18:
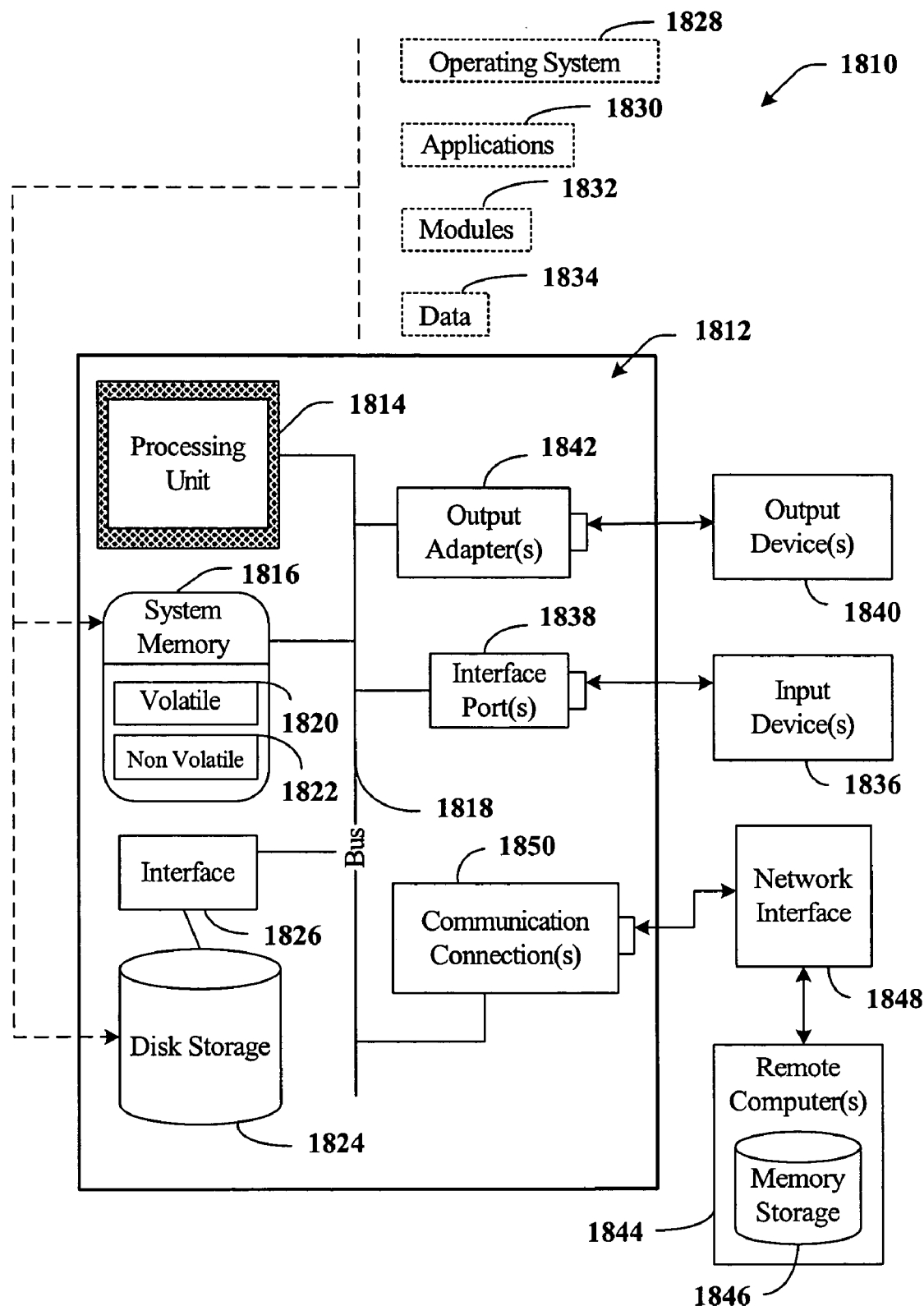
FIG. 18 is a schematic block diagram illustrating a suitable operating environment in accordance with an aspect of the present invention.
Figure 19:
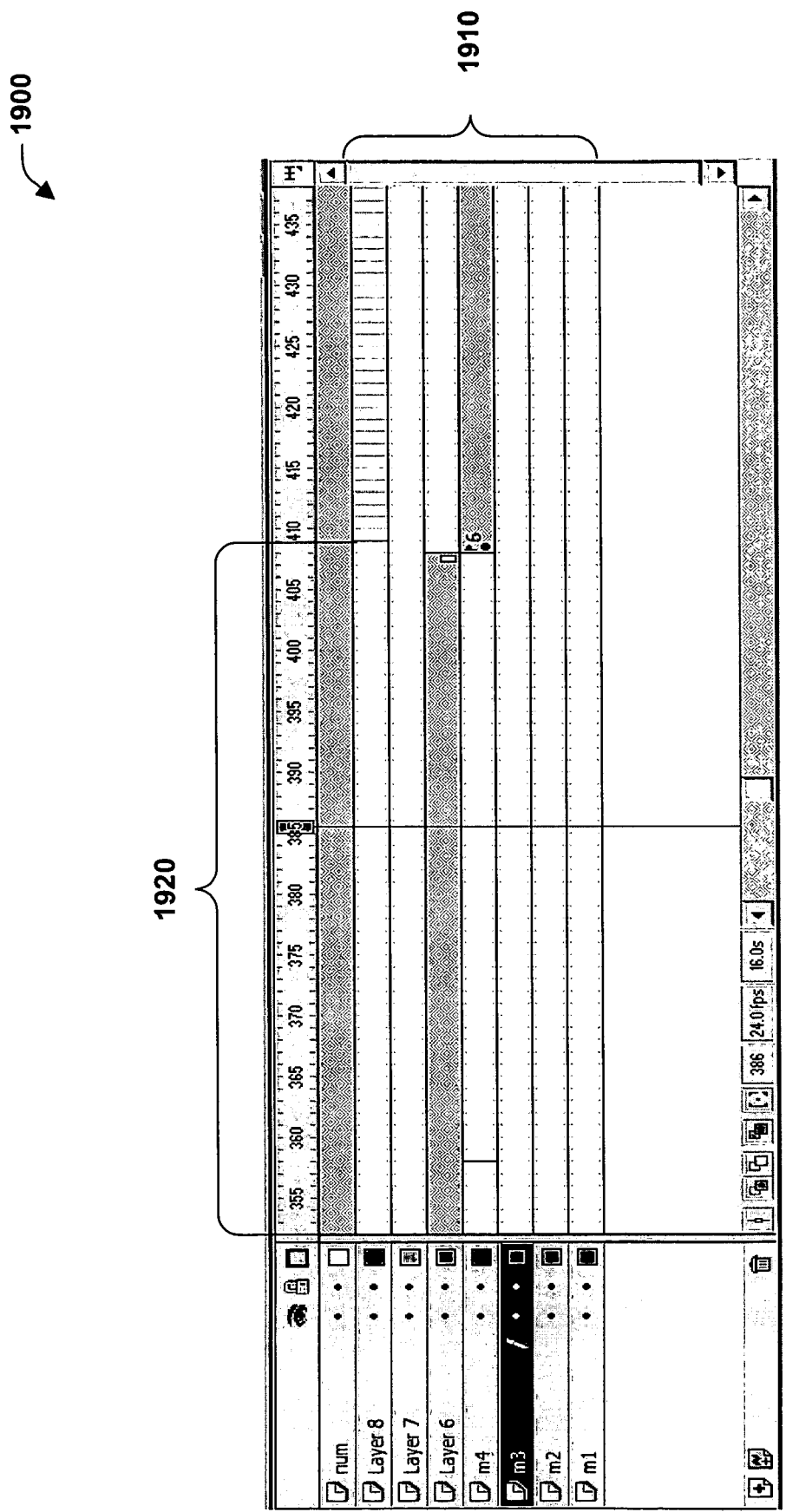
FIG. 19 is an illustration of a conventional timeline user interface as is known in the prior art.

In order to provide a context for the various aspects of the invention, FIG. 18 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 18, an exemplary environment 1810 for implementing various aspects of the invention includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multi-processor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/non-volatile computer storage media. FIG. 18 illustrates, for example disk storage 1824. Disk storage 4124 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the present invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers, among other output devices 1840, that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An interactive computer-implemented system for specifying and executing temporal order events, comprising a processor executing:
    a constraint component that receives, from a user, loose temporal constraints associated with a plurality of events, wherein the loose temporal constraints specify information about execution of the plurality of events, and wherein the loose temporal constraints specify relative timing information but not exact literal times that each of the plurality of events is to be executed;
    a system information component that receives execution system information comprising one or more of available memory, cache coherency, data throughput or number of processors; and
    an order component that determines a plurality of event execution orders in accordance with the loose temporal constraints and via utility-based analysis of the execution system information, and selects an optimal event execution order from the plurality of event execution orders based on the execution system information; wherein:
        each of the plurality of event execution orders is consistent with the loose temporal constraints supplied by the user;
        each of the plurality of execution orders specifies exact literal times each of the plurality of events is executed;
        the exact literal times are consistent with the loose temporal constraints; and
        all of the plurality of execution orders do not provide the same specific temporal constraints on the plurality of events, but all of the plurality of execution orders are based on the loose temporal constraints.

2. The system of claim 1, wherein a constraint from among the loose temporal constraints is an event start and/or a stop time.

3. The system of claim 1, wherein a constraint from among the loose temporal constraints is event duration and/or a filter.

4. The system of claim 1, wherein the system information component provides information about an execution system to the order component to facilitate selection of the optimal event execution order.

5. The system of claim 4, the information about an execution system includes data throughput rate.

6. An interactive computer-implemented system for specifying and executing temporal order events, comprising a processor executing:
    a display component that provides a plurality of object workspaces, wherein the workspaces are user interfaces including a past, present and future space, wherein the present space is an editable area, and wherein the past and future space specify temporal constraints associated with a plurality of events;
    a design component that temporally associates and disassociate objects in the editable area, wherein the design component receives, from a user, loose temporal constraints governing event execution orders, wherein the loose temporal constraints specify relative timing information but not exact literal times that each of the plurality of events is to be executed; and
    an order component that determines a plurality of event execution orders, wherein:
        each of the plurality of event execution orders is consistent with the loose temporal constraints supplied by the user;

each of the plurality of execution orders provides a sequence by which the plurality of events could be executed in accordance with the loose temporal constraints;

each of the plurality of execution orders specifies exact literal times each of the plurality of events is executed;

the exact literal times are consistent with the loose temporal constraints;

all of the plurality of execution orders do not provide the same specific temporal constraints on the plurality of events, but all of the plurality of execution orders are based on the loose temporal constraints; and the order component selects an optimal event execution order from the plurality of event execution orders in accordance with execution system information.

7. The system of claim 6, object workspaces that facilitate a graphical-based approach to specify relationships amongst objects.

8. The system of claim 6, non-associated objects are executed randomly.

9. The system of claim 6, the design component comprising a specification component that receives hard start and/or end times for events associated with objects.

10. The system of claim 6, the design component temporally associates objects as a function of respective location in the editable area.

11. The system of claim 6, further comprising a duration component that receives information regarding event duration.

12. The system of claim 6, the design component receives and executes information related to nested events associated with respective objects.

13. The system of claim 6, further comprising a policy component that applies predefined rules to execution of the objects.

14. The system of claim 6, further comprising a policy component that applies predefined rules to editing of the objects.

15. The system of claim 6, the design component receives and executes information regarding hierarchical relationship of respective objects.

16. The system of claim 6, the design component receives and executes information regarding dependency relationship of respective objects.

17. The system of claim 6, further comprising a query component that searches for events that satisfy a query, and displays objects associated with the events in temporal order.

18. The system of claim 17, the query component provides context information for respective objects.

19. The system of claim 6, objects placed in the past area are executed prior to objects in the present area and objects placed in the future area are executed after objects in the present area.

20. The system of claim 8, the design component associates objects in a non-linear conditional manner.

21. The system of claim 6, the design component associates objects via iterative loops.

22. The system of claim 6, the design component associates objects based on a specified version.

23. A computer-implemented method for specifying and executing temporal order events comprising the following computer executable instructions stored on a tangible computer readable medium:

receiving, from a user, loose temporal constraints associated with a plurality of events, wherein the loose temporal constraints specify information about execution of the plurality of events, and wherein the loose temporal constraints do not specify exact literal times that each of the plurality of events is to be executed;

receiving execution system information comprising one or more of available memory, cache coherency, data throughput or number of processors;

generating a plurality of execution orders for the plurality of events in accordance with the loose temporal constraints, wherein:

each of the plurality of event execution orders is consistent with the loose temporal constraints supplied by the user;

each of the plurality of execution orders specifies exact literal times each of the plurality of events is executed;

the exact literal times are consistent with the loose temporal constraints; and all of the plurality of execution orders do not provide the same specific temporal constraints on the plurality of events, but all of the plurality of execution orders are based on the loose temporal constraints and on the execution system information;

selecting an optimal event order based in part on the system execution information;

outputting the optimal event execution order.

24. A method, comprising:

storing, in a memory communicatively coupled to a processor, computer-executable instructions for performing the method, wherein the method orders events to be executed by an execution system;

executing the instructions on the processor;

according to the instructions being executed:

receiving object data associated with events from a workspace including at least one of a past, present, or future area;

associating objects temporally based at least in part upon relative object locations;

generating a plurality of execution orders based at least on the temporal association of the objects;

wherein the received object data is from a user, and comprises loose temporal constraints associated with a plurality of events, wherein the loose temporal constraints specify information about execution of the plurality of events, and wherein the loose temporal constraints do not specify exact literal times that each of the plurality of events is to be executed;

receiving execution system information comprising one or more of available memory, cache coherency, data throughput or number of processors;

generating a plurality of execution orders for the plurality of events in accordance with the constraints, wherein:

each of the plurality of event execution orders is consistent with the loose temporal constraints supplied by the user;

each of the plurality of execution orders specifies exact literal times each of the plurality of events is executed;

the exact literal times are consistent with the loose temporal constraints; and all of the plurality of execution orders do not provide the same specific temporal constraints on the plurality of events, but all of the plurality of execution orders are based on the loose temporal constraints;

selecting an execution order of events from the plurality of event execution orders based at least on information comprising available memory, cache coherency, data throughput and number of processors.

25. The method of claim 24, further comprising associating objects based on one or more operational objects.

26. The method of claim 25, wherein the operational objects correspond to at least a loop, a trigger, a conditional and hard start and/or stop times.

27. The method of claim 24, wherein objects are associated in a non-linear conditional manner.

28. The method of claim 24, wherein the objects are associated via iterative loops.

29. The system of claim 6, wherein information about event start and stop times and event duration is communicated with a particular object.

30. The system of claim 29, wherein the objects are bars and fuzzy edges on the bars indicate an unspecified time.

31. The system of claim 30, wherein the fuzzy edges on at beginning of the bar indicate an unspecified start time and the fuzzy logic on at end of the bar indicates an unspecified end time and/or duration.

32. The system of claim 30, wherein hard bold edges on the bar specifies specific start and/or stop time.

33. The system of claim 1, wherein the execution system information comprises at least available memory, cache coherency, data throughput and number of processors of the system.

34. The system of claim 6, wherein the temporal constraints comprising one specific event must finish before another specific event starts.

35. The system of claim 6, wherein the past and future space provide a context for navigation to a user during application development.

* * * * *